(12) United States Patent
Kim et al.

(10) Patent No.: US 8,259,162 B2
(45) Date of Patent: Sep. 4, 2012

(54) METHOD AND APPARATUS FOR GENERATING STEREOSCOPIC IMAGE DATA STREAM FOR TEMPORALLY PARTIAL THREE-DIMENSIONAL (3D) DATA, AND METHOD AND APPARATUS FOR DISPLAYING TEMPORALLY PARTIAL 3D DATA OF STEREOSCOPIC IMAGE

(75) Inventors: Yong-tae Kim, Seoul (KR); Jae-seung Kim, Yongin-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1062 days.

(21) Appl. No.: 12/178,707

(22) Filed: Jul. 24, 2008

(65) Prior Publication Data
US 2009/0195640 A1   Aug. 6, 2009

(30) Foreign Application Priority Data
Jan. 31, 2008 (KR) .................. 10-2008-0010320

(51) Int. Cl.
*H04N 13/04* (2006.01)
(52) U.S. Cl. .................. 348/51; 348/36; 348/42; 348/43
(58) Field of Classification Search .............. 348/36, 348/42, 43, 51
See application file for complete search history.

(56) References Cited

U.S. PATENT DOCUMENTS

| 5,581,638 | A | * | 12/1996 | Givens et al. ............ 382/294 |
| 8,059,939 | B2 | * | 11/2011 | Sasaki et al. ............ 348/51 |
| 8,149,267 | B2 | * | 4/2012 | Sasaki et al. ............ 348/42 |
| 2008/0303893 | A1 | | 12/2008 | Kim et al. |
| 2010/0271465 | A1 | * | 10/2010 | Lee et al. ............ 348/51 |
| 2011/0038614 | A1 | * | 2/2011 | Chen et al. ............ 348/51 |
| 2011/0050853 | A1 | * | 3/2011 | Zhang et al. ............ 348/44 |
| 2011/0158604 | A1 | * | 6/2011 | Sasaki et al. ............ 348/42 |
| 2011/0164121 | A1 | * | 7/2011 | Ikeda et al. ............ 348/51 |

OTHER PUBLICATIONS

Kyuheon Kim et al., Text of ISO/IEC CD 23000-11 for Stereoscopic Video Application Format,, Jan. 2008, Antalya, Turkey.
Kugjin Yoon et al., Updated WD 23000-11 for Stereoscopic Video Application Format, Jan. 2008, Antalya, Turkey.

\* cited by examiner

*Primary Examiner* — Phuoc Nguyen
(74) *Attorney, Agent, or Firm* — Sughrue Mion, PLLC

(57) ABSTRACT

Provided is a method of decoding a stereoscopic image data stream. In the method, a plurality of monoscopic image data regions are determined from among image data regions of a stereoscopic image data stream; a composition time stamp (CTS) of each of the monoscopic image data regions is extracted; and, if there are colliding image data regions having the same CTS from among the monoscopic image data regions, monoscopic image data is extracted from a monoscopic image data region of a main stream of the colliding image data regions.

19 Claims, 19 Drawing Sheets

FIG. 6A

| 3D_Period( ) { | Descriptor |
|---|---|
| number_of_3D_period | u(32) |
| for( i = 0; i < number_of_3D_period; i++ ){ | |
| start_position[i] | u(32) |
| end_position[i] | u(32) |
| } | |
| } | |

FIG. 6B

| stereoFormat_params( ) { | Descriptor |
|---|---|
| Stereo_format_type | u(32) |
| LR_first | u(1) |
| LR_width_ratio | u(32) |
| LR_height_ratio | u(32) |
| scaling_method | u(8) |
| If(scaling_method >= 0x03){ | |
| scaling_func() | |
| } | |
| } | |

FIG. 6C

| Stereo_format_type | Descriptor |
|---|---|
| 0 | Vertical line interleaved format |
| 1 | Horizontal line interleaved format |
| 2 | Top-down format |
| 3 | Side-by-side format |
| 4 | Field sequential format |
| 5 | Frame sequential format |
| 6 | Block-interleaved format |
| 7 | Disparity map |
| 8 | Depth map |
| 9 | Disparity + Motion map |
| 10 | Monoscopic image (Left view) |
| 11 | Monoscopic image (Right view) |
| 12~255 | User private |

FIG. 6D

| identification | LR_first = 0 | | LR_first =1 | |
|---|---|---|---|---|
| | Left view | Right View | Left view | Right view |
| Vertical line interleaved format (Parallax barrier format) | Odd line | Even line | Even line | Odd line |
| Horizontal line interleaved format | Odd line | Even line | Even line | Odd line |
| Top-down format | Upper side | Lower side | Lower side | Upper side |
| Side-by-side format | Left side | Right side | Right side | Left side |
| Field sequential format | Odd field | Even field | Even field | Odd field |
| Frame sequential format | Odd frame | Even frame | Even Frame | Even frame |
| Block-interleaved format | Odd number of MB | Even number of MB | Even number of MB | Odd number of MB |
| Two ES | Main media (ES1) | Sub media (ES2) | Sub media (ES2) | Main media (ES1) |
| User private | | | | |

FIG. 7B

| | Frame number | CT |
|---|---|---|
| S1_L | 1 | 10 |
| | ... | ... |
| | 300 | 3000 |
| M1 | 301 | 3010 |
| | ... | ... |
| | 500 | 5000 |
| S2_L | 501 | 7010 |
| | ... | ... |
| | 800 | 10000 |

750

| | Frame number | CT |
|---|---|---|
| S2_R | 1 | 10 |
| | ... | ... |
| | 300 | 3000 |
| M2 | 301 | 5010 |
| | ... | ... |
| | 500 | 7000 |
| S2_R | 501 | 7010 |
| | ... | ... |
| | 800 | 10000 |

| | Frame number | CT |
|---|---|---|
| S1_L | 1 | 10 |
| | ... | ... |
| | 300 | 3000 |
| M1 | 301 | 3010 |
| | ... | ... |
| | 500 | 5000 |
| S2_L | 501 | 5010 |
| | ... | ... |
| | 800 | 8000 |

~850

| | Frame number | CT |
|---|---|---|
| S2_R | 1 | 10 |
| | ... | ... |
| | 300 | 3000 |
| M2 | 301 | 3010 |
| | ... | ... |
| | 500 | 5000 |
| S2_R | 501 | 5010 |
| | ... | ... |
| | 800 | 8000 |

| scaling_method | identification |
|---|---|
| 0 | Sampling method |
| 1 | Linear method |
| 2 | Cubic convolution |
| 3~255 | User private |

FIG. 9B

| scaling_func () { | Descriptor |
|---|---|
| number_of_hor_coeff | u(8) |
| for( i = 0; i < number_of_hor_coeff; i++ ){ | |
| hor_scaling_coeff[i] | u(32) |
| } | |
| number_of_ver_coeff | u(8) |
| for( i = 0; i < number_of_ver_coeff; i++ ){ | |
| ver_scaling_coeff[i] | u(32) |
| } | |
| } | |

FIG. 9C

| Stereoscopic_Camera_info( ) { | Descriptor |
|---|---|
| camera_distance | u(32) |
| view_type | u(1) |
| View_distance_vs_depth | u(32) |
| camera_type | u(8) |
| is_camera_params | u(1) |
| if(is_camera_params){ | |
| Camera_params() | |
| } | |
| is_parallax_info | u(1) |
| If(is_parallax_info){ | |
| Parallax_info() | |
| } | |
| } | |

FIG. 9D

| Camera_params() { | Descriptor |
|---|---|
| number_of_camera_params | u(8) |
| for( i = 0; i < camera_params_size; i++ ) | |
| Left_camera_params[i] | u(32) |
| for( i = 0; i < camera_params_size; i++ ) | |
| Right_camera_params[i] | u(32) |
| } | |

FIG. 9E

| Parallax_info() { | Descriptor |
|---|---|
| num_of_Global_disparity | u(32) |
| for( i = 0; i < num_of_Global_disparity; i++ ){ | |
| global_disparity_index[i] | u(32) |
| global_disparity[i] | u(16) |
| } | |
| num_of_representative_disparity | u(8) |
| for( i = 0; i < num_of_representative_disparity; i++ ){ | |
| representative_disparity[i] | u(16) |
| } | |
| } | |

METHOD AND APPARATUS FOR GENERATING STEREOSCOPIC IMAGE DATA STREAM FOR TEMPORALLY PARTIAL THREE-DIMENSIONAL (3D) DATA, AND METHOD AND APPARATUS FOR DISPLAYING TEMPORALLY PARTIAL 3D DATA OF STEREOSCOPIC IMAGE

CROSS-REFERENCE TO RELATED PATENT APPLICATIONS

This application claims priority from Korean Patent Application No. 10-2008-0010320, filed on Jan. 31, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to generating a stereoscopic image data stream containing parameters representing information regarding a three-dimensional/two-dimensional (3D/2D) image in units of data regions of a stereoscopic image that partially has 3D and 2D data regions, and reconstructing an original image by decoding a stereoscopic image data stream containing such parameters.

2. Description of the Related Art

Various methods have been proposed in order to transmit a stereoscopic image. For example, there have been developed various standard techniques, such as the Moving Picture Experts Group (MPEG)-2 multi-view video profile (MVP) standards, a depth map transmission method according to the MPEG-4 multiple auxiliary component (MAC) standards, and a multi-view coding (MVC) method according to the MPEG-4 advanced video coding (AVC)/H.264 standards. Multimedia Application Format (MAF) stereoscopic image file format standards are now being established.

FIG. 1 illustrates an example of a partial 3D/2D image region on the time axis when a stereoscopic image data stream 100 has first and second elementary streams 110 and 120.

A stereoscopic image data stream may contain a plurality of elementary streams. The first and second elementary streams 110 and 120 are recorded in an 'mdat' box of the stereoscopic image data stream 100. In the first elementary stream 110, a first left-view image 112, a single view image 114, and second left-view image 116 are respectively recorded in a first composition time (CT) region, a second CT region, and a third CT region. In the second elementary stream 120, a first right-view image 122 and a second right-view image 126 are respectively recorded in a first CT region and a third CT region.

In the stereoscopic image data stream 100 of FIG. 1, a 2D image, i.e., the single view image 114, is recorded only in the elementary stream 110, and only stereo image data is recorded in the elementary stream 120.

FIG. 2 illustrates another example of a partial 3D/2D image region on the time axis when a stereoscopic image data stream 200 has first and second elementary streams 210 and 220.

In the stereoscopic image data stream 200, the first and second elementary streams 210 and 220 are recorded. In the first and second elementary streams 210 and 220, both a stereo image and a single view image are recorded. That is, stereo images 212 and 216 and a single view image 214 are recorded in the first elementary stream 210, and stereo images 222 and 226 and a single view image 224 are recorded in the second elementary stream 220. However, if the same composition time stamp (CTS) is contained in the single view images 214 and 224 being respectively recorded in the two elementary streams 210 and 220, it is impossible for a reproducing apparatus (not shown) to determine which one is to be reproduced from among the single view images 214 and 224.

FIG. 3 illustrates a base construction of an International Standardization Organization (ISO)-based media file format.

An ISO-based media file format includes an 'ftyp' box, a 'moov' box, and an 'mdat' box.

The 'ftyp' box includes a description of file type and a compatible format. An appropriate decoder can normally reproduce image data according to a compatible type.

Each piece of data included in the 'moov' box consists of a construction based on an object which is referred to as an 'atom', and contains information regarding content, such as frame rate, bit rate, and image size, 'sync' information, such as fast forwarding (FF)/rewarding (REW), which supports reproducing functions, and various information for reproducing files.

The 'mdat' box substantially includes stream data in units of traks, in which each of video data and audio data is stored in units of frames.

SUMMARY OF THE INVENTION

Exemplary embodiments of the present invention provide a method and apparatus for generating a stereoscopic image data stream containing stereoscopic image parameters for enabling a single view image that is to be reproduced to be automatically selected from single view images recorded in a plurality of elementary streams of the stereoscopic image data stream when the single view images have the same CTS.

Exemplary embodiments of the present invention also provide a method and apparatus for allowing a single view image that is to be reproduced to be automatically selected and decoded in a receiving side from among a plurality of single view images having the same CTS by using parameters of the stereoscopic image. Throughout the specification, the language "record" or "recording" means "insert" or "inserting".

According to an exemplary embodiment of the present invention, there is provided a method of generating a stereoscopic image data stream, the method including recording, in a header region of the stereoscopic image data stream, stereo image format information regarding a method of generating a mixed image containing information regarding base and additional view images of a stereoscopic image; recording arrangement order information in the header region of the stereoscopic image data stream, where the arrangement order information represents order in which the information regarding the base and additional view images is arranged in the mixed image; and recording mixed image data regarding the stereoscopic image in a payload region of the stereoscopic image data stream.

The stereoscopic image data stream may be divided in units of data regions, and the stereo image format information and the arrangement order information are determined for at least one data region.

The stereo image format information may include at least one of a vertical line interleaved format, a horizontal line interleaved format, a top-down format, a side-by-side format, a field sequential format, a frame sequential format, a block interleaved format, a disparity map, a depth map, a disparity and motion map, a monoscopic base view image format, and a monoscopic additional view image format.

If the mixed image data is recorded in a main stream and an auxiliary stream, the arrangement order information may represent whether the information regarding the base view image or the information regarding the auxiliary image is arranged in the main stream and that the other of the information regarding the base view image or the information regarding the auxiliary image is arranged in the auxiliary stream.

The stereoscopic image data stream may have an ISO-based media file format.

If the stereoscopic image data stream has the ISO-based media file format, the ISO-based media file format may include a moov box, an mdat box, and a meta box. The stereo image format information and the arrangement order information may be extracted from at least one of a lower level box of the meta box, a lower level box of the moov box, one lower level box of a trak box which is a lower level of the moov box, a lower level box of a trak box, and a lower level box of a meta box which is a lower level of the trak box.

According to another exemplary embodiment of the present invention, there is provided a method of decoding a stereoscopic image data stream, the method comprising determining a plurality of monoscopic image data regions from among image data regions of the stereoscopic image data stream; extracting a composition time stamp of each of the monoscopic image data regions; and, if there are colliding image data regions having the same composition time stamps of the monoscopic image data regions, extracting monoscopic image data from a monoscopic image data region of a main stream from among the colliding image data regions. The stereoscopic image data stream comprises the main stream and at least one auxiliary stream.

The determining the plurality of monoscopic image data regions may include extracting stereo image format information regarding at least one image data region of the stereoscopic image data stream, from the stereoscopic image data stream; and determining a monoscopic image data region from among the image data regions, based on the extracted stereo image format information, wherein the stereo image format information relates to an image format according to a method of generating a mixed image using information regarding a base view image and an additional view image of a stereoscopic image.

The extracting of the monoscopic image data may include extracting arrangement order information regarding each of the colliding image data regions, from the stereoscopic image data stream; and extracting monoscopic image data from an image data region of one of the main stream and the auxiliary stream, which is determined to be the main stream, based on the arrangement order information, wherein the arrangement order information represents order in which the information regarding the base and additional view images is arranged in a mixed image regarding at least one data region.

The determining of the plurality of monoscopic image data regions may include extracting stereo image format information and arrangement order information regarding at least one image data region of the stereoscopic image data stream, from the stereoscopic image data stream; and determining at least one monoscopic image data region of the main stream from among the image data regions, based on the stereo image format information and the arrangement order information. The extracting of the monoscopic image data may include extracting monoscopic image data from the determined monoscopic image data region of the main stream. The stereo image format information may relate to an image format according to a method of generating a mixed image using information regarding a base view image and an additional view image of the stereoscopic image, and the arrangement order information may represent order in which the information regarding the base and additional view images is arranged in the mixed image regarding at least one data region.

The extracting of the monoscopic image data may further include reconstructing and reproducing image data extracted from the main stream or the auxiliary stream that is determined to be first reproduced.

The method may further include determining whether the main stream or the auxiliary stream is to be first reproduced when a monoscopic image of image data of the stereoscopic image data stream is reproduced.

The stereo image format information may include at least one of a vertical line interleaved format, a horizontal line interleaved format, a top-down format, a side-by-side format, a field sequential format, a frame sequential format, a block interleaved format, a disparity map, a depth map, a disparity and motion map, a monoscopic base view image format, and a monoscopic additional view image format.

The stereoscopic image data stream may have an ISO-based media file format.

If the stereoscopic image data stream has the ISO-based media file format, the ISO-based media file format may include a moov box, a mdat box, and a meta box, and the stereo image format information, and the arrangement order information may be extracted from at least one of a lower level box of the meta box, a lower level box of the moov box, one lower level box of a trak box which is a lower level of the moov box, a lower level box of a trak box, and a lower level box of a meta box which is a lower level of the trak box.

According to another exemplary embodiment of the present invention, there is provided an apparatus for generating a stereoscopic image data stream, the apparatus including a stereo image format information recording unit that records stereo image format information regarding a method of generating a mixed image containing information regarding base and additional view images of a stereoscopic image, in a header region of the stereoscopic image data stream; an arrangement order information recording unit that records arrangement order information in the header region of the stereoscopic image data stream, where the arrangement order information represents order in which the information regarding the base and additional view images is arranged in the mixed image; and an image data recording unit that records mixed image data regarding the stereoscopic image in a payload region of the stereoscopic image data stream.

According to another exemplary embodiment of the present invention, there is provided an apparatus for decoding a stereoscopic image data stream, the apparatus comprising a monoscopic image data period determination unit which determines a plurality of monoscopic image data regions from among image data regions of the stereoscopic image data stream; a composition time stamp extraction unit which extracts a composition time stamp of each of the plurality of monoscopic image data regions; and a collision monoscopic image data extraction unit extracting monoscopic image data from a monoscopic image data region of a main stream from among colliding image data regions when there are colliding image data regions having the same composition time stamp of the monoscopic image data regions.

According to another exemplary embodiment of the present invention, there is provided a computer readable medium having recorded thereon a program for executing the above method of generating a stereoscopic image data stream.

According to another aspect of the present invention, there is provided a computer readable medium having recorded thereon a computer program for executing the above method of decoding a stereoscopic image data stream.

BRIEF DESCRIPTION OF THE DRAWINGS

The above and other exemplary aspects of the present invention will become more apparent by the following detailed description of exemplary embodiments thereof with reference to the attached drawings in which:

FIG. 6A is a diagram illustrating syntax of 3D period information used for generating a stereoscopic image data stream, according to an exemplary embodiment of the present invention;

FIG. 6B is a diagram illustrating syntax of mixed image formation information used for generating a stereoscopic image data stream, according to an exemplary embodiment of the present invention FIG. 6C is a diagram illustrating a mixed image format of mixed image formation information used for generating a stereoscopic image data stream, according to an exemplary embodiment of the present invention;

FIG. 6D is a diagram illustrating an arrangement order of mixed image formation information used for generating a stereoscopic image data stream, according to an exemplary embodiment of the present invention;

FIG. 7B are tables illustrating CTs of the two ESs of the stereoscopic image data stream illustrated in FIG. 7A;

FIG. 8B are tables illustrating CTs of the two ESs of the stereoscopic image data stream illustrated in FIG. 8A;

FIG. 9A is a diagram illustrating a scaling function used in a scaling method for generating a stereoscopic image data stream, according to an exemplary embodiment of the present invention;

FIG. 9B is a diagram illustrating syntax of a scaling method used for generating a stereoscopic image data stream, according to an exemplary embodiment of the present invention;

FIG. 9C is a diagram illustrating syntax of camera information used for generating a stereoscopic image data stream according to an exemplary embodiment of the present invention;

FIG. 9D is a diagram illustrating syntax of camera parameters of camera information used for generating a stereoscopic image data stream, according to an exemplary embodiment of the present invention;

FIG. 9E is a diagram illustrating syntax of parallax information used for generating a stereoscopic image data stream according to an exemplary embodiment of the present invention;

DETAILED DESCRIPTION OF EXEMPLARY EMBODIMENTS OF THE INVENTION

An apparatus for generating a stereoscopic image data stream according to exemplary embodiments of the present invention will now be described in detail with reference to FIGS. 4A and 4B.

Figure 1:
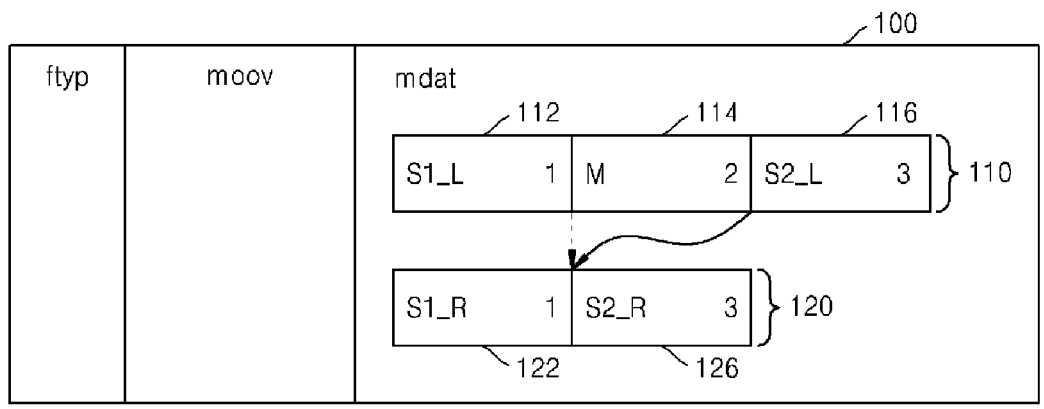
FIG. 1 illustrates an example of a partial three-dimensional/two-dimensional (3D/2D) image region on the time axis when a stereoscopic image data stream has two elementary streams.
Figure 2:
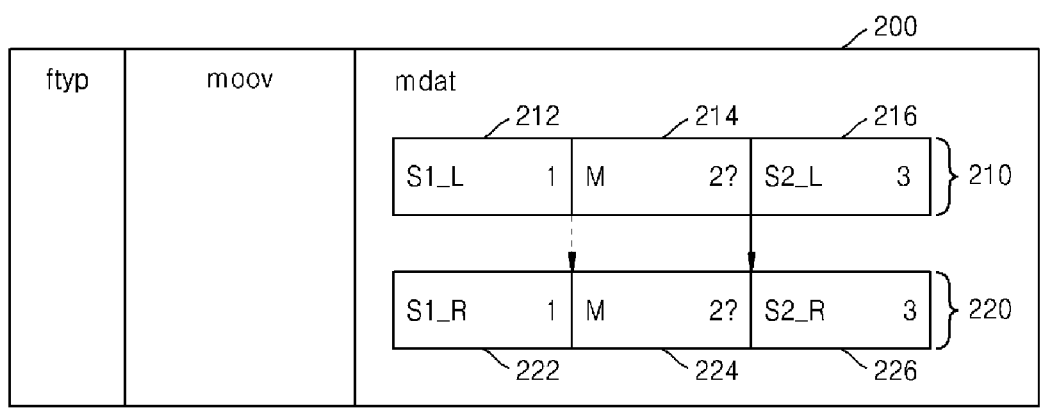
FIG. 2 illustrates another example of a partial 3D/2D image region on the time axis when a stereoscopic image data stream has two elementary streams.
Figure 3:
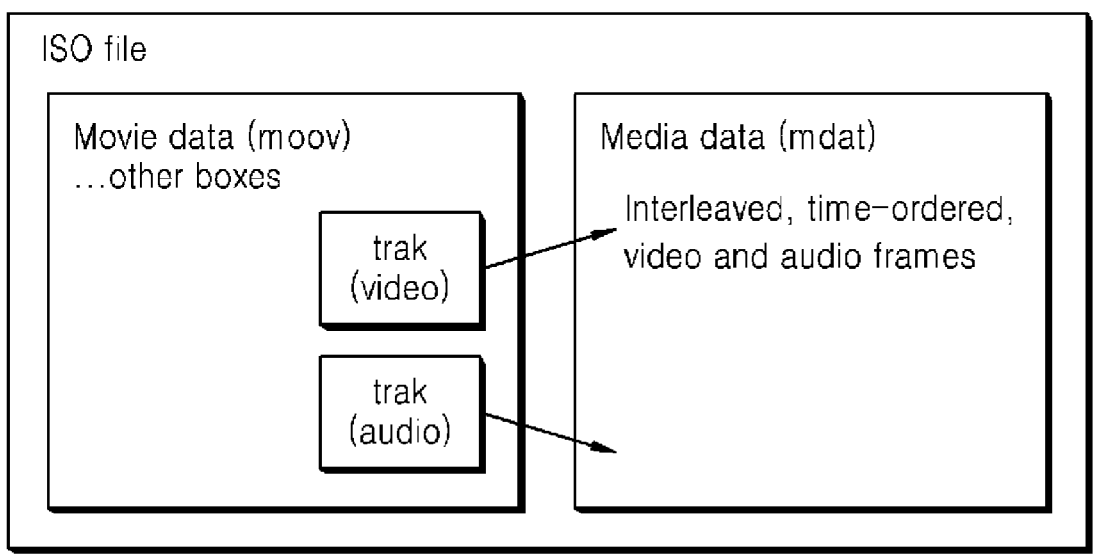
FIG. 3 illustrates a base construction of an ISO-based media file format.
Figure 4A:
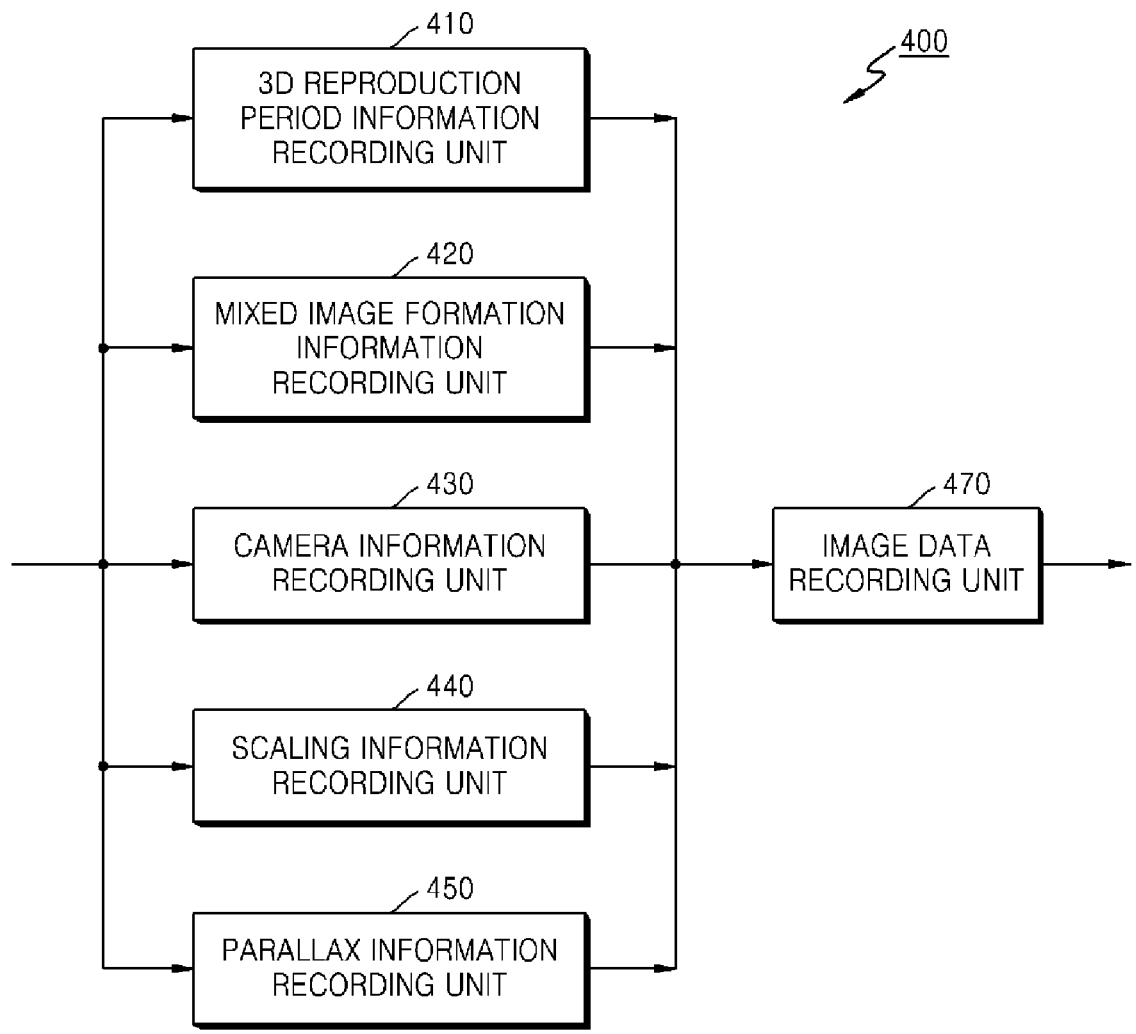
FIG. 4A is a block diagram of an apparatus for generating a stereoscopic image data stream according to an exemplary embodiment of the present invention.

FIG. 4A is a block diagram of an apparatus 400 for generating a stereoscopic image data stream ("the generating apparatus 400"), according to an exemplary embodiment of the present invention.

Referring to FIG. 4A, the generating apparatus 400 includes a 3D reproduction period information recording unit 410, a mixed image formation information recording unit 420, a camera information recording unit 430, a scaling information recording unit 440, a parallax information recording unit 450, and an image data recording unit 470.

The 3D reproduction period information recording unit 410 records, in a header region of the stereoscopic image data stream, 3D reproduction period information regarding three-dimensionally reproduced stereoscopic image data of image data recorded in a payload region of the stereoscopic image data stream. The 3D reproduction period information recording unit 410 then outputs the 3D reproduction period information to the image data recording unit 470.

The mixed image formation information recording unit 420 records, in a header region, mixed image formation information on a method of forming a mixed image having information on base and additional view images. The mixed image formation information recording unit 420 then outputs the mixed image formation information to the image data recording unit 470.

The camera information recording unit 430 records, in the header region, camera information on cameras used for capturing a stereoscopic image. The camera information recording unit 430 then outputs the camera information to the image data recording unit 470.

The scaling information recording unit 440 records, in the header region, scaling information on a scaling method used when the mixed image having the information on the base and additional view images is generated. The scaling information recording unit 440 then outputs the scaling information to the image data recording unit 470.

The parallax information recording unit 450 records, in the header region, parallax information between base and additional view images of the stereoscopic image. The parallax information recording unit 450 then outputs the parallax information to the image data recording unit 470.

After header information, such as the 3D reproduction period information, the mixed image formation information, the camera information, the scaling information, and the parallax information, are completely recorded in the header region by the 3D reproduction period information recording unit 410, the mixed image formation information recording unit 420 the camera information recording unit 430, the scaling information recording unit 440, and the parallax information recording unit 450, respectively. Then the header information is output to the image data recording unit 470.

The image data recording unit 470 records image data in the payload region of the stereoscopic image data stream and then outputs the stereoscopic image data stream.

As such, according to the current embodiment, in a stereoscopic image data stream generated by the generating apparatus 400, image data is recorded in a payload region of the stereoscopic image data stream, and at least one piece of information from among header information, such as the 3D reproduction period information, the mixed image formation information, the camera information, the scaling information, and the parallax information, is recorded in a header region of the stereoscopic image data stream.

Figure 4B:
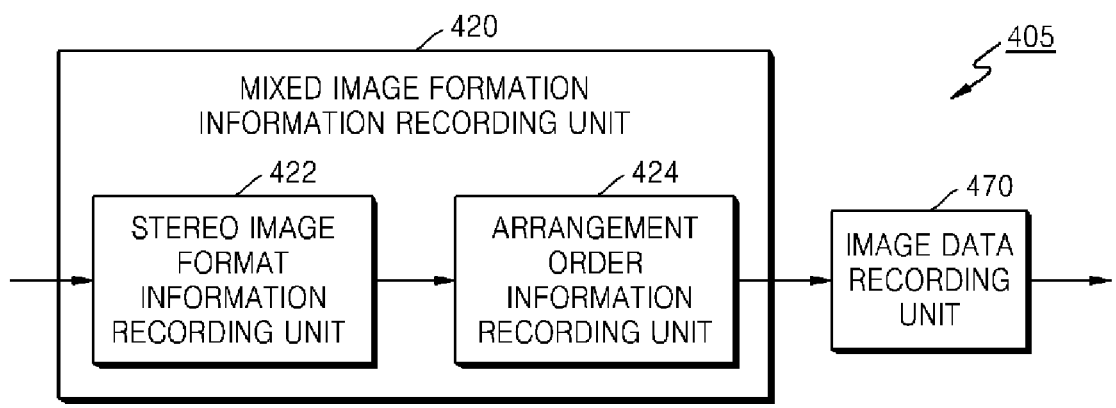
FIG. 4B is a block diagram of an apparatus for generating a stereoscopic image data stream according to another exemplary embodiment of the present invention.

FIG. 4B is a block diagram of an apparatus 405 for generating a stereoscopic image data stream ("the generating apparatus 405"), according to another exemplary embodiment of the present invention.

Referring to FIG. 4B, the generating apparatus 405 includes a mixed image formation information recording unit 420, as illustrated in FIG. 4A, and an image data recording unit 470. The mixed image formation information recording unit 420 includes a stereo image format information recording unit 422 and an arrangement order information recording unit 424.

In a header region of the stereoscopic image data stream, the stereo image format information recording unit 422 records stereo image format information regarding an image format according to a method of forming a mixed image having information on base and additional view images of the stereoscopic image. The stereo image format information recording unit 422 then outputs the stereo image format information to the arrangement order information recording unit 424.

In the header region of the stereoscopic image data stream, the arrangement order information recording unit 424 records arrangement order information regarding the order in which the information regarding the base and additional view images are arranged in the mixed image of the stereoscopic image. The arrangement order information recording unit 424 then outputs the arrangement order information to the image data recording unit 470.

A stereoscopic image data stream may be divided in units of data regions, and the stereo image format information and the arrangement order information may be set for at least one data region. Thus, stereo format information or arrangement order information may be unified with respect to all data regions or may change in units of data regions.

In an exemplary embodiment of the present invention, if data regarding a mixed image is recorded in a main elementary stream and an auxiliary elementary stream of a stereoscopic image data stream, the arrangement order information indicates which one of base and additional view images of the mixed image is arranged in the main elementary stream. That is, the arrangement order information may represent (i) a case where the base view image is arranged in the main elementary stream and the additional view image is arranged in the auxiliary elementary stream or (ii) a case where the additional view image is arranged in the main elementary stream and the base view image is arranged in the auxiliary elementary stream.

The image data recording unit 470 records the mixed image data in a payload region of the stereoscopic image data stream and then outputs the stereoscopic image data stream.

In an exemplary embodiment of the present invention, if the stereoscopic image data stream has an ISO-based media file format, the image data recording unit 470 records the stereo image format information and the arrangement order information in at least one of a lower level box of a 'meta' box, a lower level box of a 'moov' box, a lower level box of a 'trak' box that is a lower level of the 'moov' box, a lower level box of a 'trak' box, and a lower level box of a 'meta' box which is a lower level of the 'trak' box.

Figure 5:
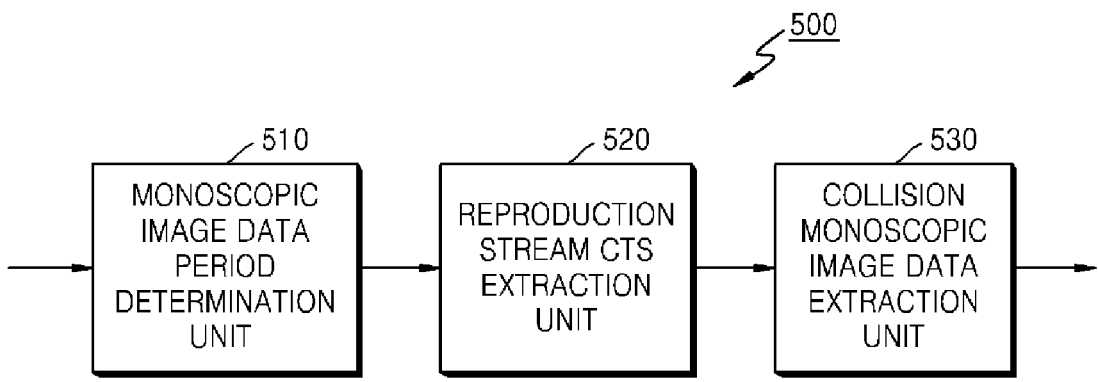
FIG. 5 is a block diagram of an apparatus for decoding a stereoscopic image data stream according to an exemplary embodiment of the present invention.

FIG. 5 is a block diagram of an apparatus 500 for decoding a stereoscopic image data stream ("the decoding apparatus 500") according to an exemplary embodiment of the present invention.

The decoding apparatus 500 includes a monoscopic image data period determination unit 510, a reproduction stream CTS extraction unit 520, and a collision monoscopic image data extraction unit 530.

The monoscopic image data period determination unit 510 receives the stereoscopic image data stream, determines a monoscopic image data region from among image data regions of the stereoscopic image data stream, and then outputs the monoscopic image data region to the reproduction stream CTS extraction unit 520.

In an exemplary embodiment of the present invention, the monoscopic image data period determination unit 510 extracts stereo image format information regarding at least one data region of the stereoscopic image data stream, from the stereoscopic image data stream. The monoscopic image data period determination unit 510 then determines a monoscopic image data region from among a plurality of image data regions of the stereoscopic image data stream by using the extracted stereo image format information. That is, an image data region having a monoscopic image format as a stereo image format is detected from among the image data regions.

The reproduction stream CTS extraction unit 520 extracts CTSs of respective monoscopic image data regions and then outputs the extracted CTSs to the collision monoscopic image data extraction unit 530.

A CTS indicates time when image data of a corresponding data region is reproduced when image data of a stereoscopic image data stream is reconstructed and reproduced. In the case of a stereo image, if image data of different streams have the same CTS, the image data of the different streams can be respectively displayed in the same time zone, based on a method of reproducing a stereo image. However, in the case of a monoscopic image, only image data of one stream must be displayed, and thus, collision occurs when there are a plurality of pieces of image data having the same CTS.

When colliding image data regions having the same CTS extracted by the reproduction stream CTS extraction unit 520 are present in monoscopic image data regions, the collision monoscopic image data extraction unit 530 extracts monoscopic image data from a monoscopic image data region of a main stream from among the collision image data regions.

In an exemplary embodiment of the present invention, the monoscopic image data period determination unit 510 extracts arrangement order information regarding at least one data region of a stereoscopic image data stream from the stereoscopic image data stream. The collision monoscopic image data extraction unit 530 extracts monoscopic image data from an image data region, which is determined to be a main stream, from the stereoscopic image data stream by using the extracted arrangement order information.

Here, the stereo image format information and the arrangement order information described above with respect to the decoding apparatus 500 are respectively the same as those described above with respect to the generating apparatus 405.

In another exemplary embodiment of the present invention, the monoscopic image data period determination unit 510 extracts stereo image format information and arrangement order information regarding each of a plurality of image data regions from a stereoscopic image data stream, and determines at least one monoscopic image data region of a main stream from among the image data regions, based on the stereo image format information and the arrangement order information. In this case, the collision monoscopic image data extraction unit 530 extracts monoscopic image data from the determined monoscopic image data region of the main stream.

In another exemplary embodiment of the present invention, the collision monoscopic image data extraction unit 530 first reconstructs and reproduces image data extracted from a stream that is to first be reproduced.

The decoding apparatus 500 may further include a reproduction stream determination unit that determines whether a main stream or an auxiliary stream is to be first reproduced when a monoscopic image is reproduced from among a plurality of pieces of image data of a stereoscopic image data stream monoscopic. Alternatively, a reproduction steam selection unit that receives a selection signal indicating whether a main stream or an auxiliary stream is to be first reproduced from a user that uses a reproduction stream, may further added to the decoding apparatus 500. The collision monoscopic image data extraction unit 530 may extract image data from one of the main stream and the auxiliary stream, which is selected in response to the selection signal that is input irrespective of the stereo image format information and the arrangement order information.

In an exemplary embodiment of the present invention, when collision occurs during reproduction of a monoscopic image, image data in a main stream is first reproduced but image data in a predetermined auxiliary stream may first be reproduced in response to a reproduction stream selection signal.

If the stereoscopic image data stream supplied to the decoding apparatus 500 has an ISO-based media file format, the stereo image format information and the arrangement order information are extracted from at least one of a lower level box of a 'meta' box, a lower level box of a 'moov' box, one lower level box of a 'trak' box which is a low level of the 'moov' box, a lower level box of a 'trak' box, and a lower level box of a 'meta' box which is a lower level of the 'trak' box.

A decoding method of reconstructing an image by extracting various header information from a stereoscopic image data stream, will now be described.

A stereoscopic image data stream decoding apparatus includes a receiving unit that receives a stereoscopic image data stream, a parameter extraction unit that extracts parameter information from the stereoscopic image data stream, and an image construction unit that reconstructs the original image data using the extracted parameter information.

If the decoding apparatus is based on the MPEG-4 or H.264 standard, the image reconstruction unit may include a variable-length coding decoder module, a motion compensation/prediction module, a inverse discrete cosine transformation (IDCT) module, an inverse quantization module, and a deblocking module.

The parameter extraction unit may extract 3D reproduction period information regarding a three-dimensionally reproduced data region of image data recorded in a payload region of the stereoscopic image data stream, from the stereoscopic image data stream.

The parameter extraction unit may extract stereo image format information from the stereoscopic image data stream.

The parameter extraction unit may extract camera information regarding a camera used for capturing a stereo image, from the stereoscopic image data stream.

The parameter extraction unit may extract parallax information between base and additional view images of the stereoscopic image in the header region, from the stereoscopic image data stream.

The parameter extraction unit may extract scaling information on a method of scaling base and additional view images of a mixed image, from the stereoscopic image data stream.

The parameter extraction unit may extract information regarding the total number of 3D reproduction periods, from the stereoscopic image data stream.

Also, the parameter extraction unit may extract information regarding the range of 3D reproduction periods, from the stereoscopic image data stream. The information regarding the range of 3D reproduction periods may include start index information representing a position index of a start frame of the 3D reproduction periods recorded in the payload region, and end index information representing a position index of an end frame of the 3D reproduction periods recorded in the payload region.

The parameter extraction unit may extract camera type information regarding the type of a camera used for capturing the stereo image, from the stereoscopic image data stream.

The parameter extraction unit may extract camera parameter transmission information indicating whether camera parameter information regarding the camera used for capturing the stereo image is to be transmitted, from the stereoscopic image data stream.

The parameter extraction unit may extract the camera parameter information regarding the camera used for capturing the stereo image, from the stereoscopic image data stream. Also, the parameter extraction unit may extract the camera parameter transmission information indicating whether the camera parameter information is to be transmitted, and the camera parameter information may be extracted from the stereoscopic image data stream, based on the camera parameter transmission information.

It is possible to extract at least one of information regarding the total number of camera parameter coefficients, rotation information regarding each of base and additional view cameras, translation information, information regarding an image center, information regarding a focal length, and information regarding an aspect ratio of each of base and additional view cameras, from a camera parameter.

At least one of rotation information of a base camera and rotation information of an additional camera may be extracted from the camera parameter.

At least one of translation information of a base camera and translation information of an additional camera may be extracted from the camera parameter.

Also, at least one of information regarding the focal length of a base camera and information regarding the focal length of an additional camera may be extracted from the camera parameter.

The parameter extraction unit may extract parallax information of representative disparity vectors regarding predetermined objects in the base and additional view images of the stereo image, from the stereoscopic image data stream stereoscopic image.

At least one of minimum and maximum values from among a plurality of disparity vectors may be extracted from the parallax information of the representative disparity vectors. At least one of minimum and maximum values from among disparity vectors of background and foreground may be extracted from the parallax information of the representative disparity vectors.

At least one of minimum and maximum values from among a plurality of disparity vectors of a plurality of objects may be extracted from the parallax information of the representative disparity vectors.

Also, at least one of representable minimum and maximum values of a disparity map/depth map may be extracted from the parallax information of the representative disparity vectors.

Information regarding the total number of representative disparity vectors and information regarding the values of the representative disparity vectors may be extracted from the parallax information of the representative disparity vectors.

The parameter extraction unit may extract parallax information of global disparity vectors regarding the base view image and the additional view image, from the stereoscopic image data stream.

The number of frames recorded in the payload region in which global disparity vectors are changed, global disparity starting index information indicating indexes of the frames in which the global disparity vectors are changed, and vector values of the global disparities, may be extracted from the parallax information on the global disparity vectors.

The parameter extraction unit may extract parallax information regarding predetermined objects in the base view image and the additional view image, from the stereoscopic image data stream, and the parallax information represents at least one of minimum and maximum values of a plurality of disparity vectors.

The parallax information may be at least one of maximum and minimum vector values from among representative disparity vectors of background and foreground. The parallax information may be at least one of maximum and minimum vector values from among representative disparity vectors of a plurality of objects. The parallax information may be represented with at least one of maximum and minimum vector values from among representable, representative vectors of a disparity map/a depth map. Information regarding the total number of the representative disparity vectors and information regarding the values thereof may be extracted from the parallax information.

The parameter extraction unit may extract arrangement order information from a mixed image.

If the stereoscopic image data stream has an ISO-based media file format, the parameter extraction unit may extract stereo image format information and arrangement order information from at least one of a lower level box of a 'meta' box, a lower level box of a 'moov' box, a lower level box of a 'trak' box that is a lower level of the 'moov' box, a lower level box of a 'trak' box, and a lower level box of a 'meta' box which is a lower level of the 'trak' box.

Header information of a stereoscopic image data stream generated by a stereoscopic image data stream generating apparatus, according to an exemplary embodiment of the present invention, will now be described in greater detail with reference to FIGS. 6A through 9B.

FIG. 6A is a diagram illustrating syntax of 3D period information used for generating a stereoscopic image data stream, according to an exemplary embodiment of the present invention. For example, base and additional view images may be left view and right view images, respectively.

The information on the total number of 3D reproduction periods number_of_3D_period represents the total number of 3D reproduction periods, i.e., the number of image data periods for which a user can view image data three-dimensionally.

The start index information start_position is start index information that represents a position index where a start frame of a 3D reproduction period is recorded in a payload region of the stereoscopic image data stream.

The end index information end_position is end index information that represents a position index where an end frame of the 3D reproduction period is recorded in the payload region of the stereoscopic image data stream.

Every 3D reproduction period has the start index information start_position and the end index information end_position. Thus, assuming that i is an integer, start index information start_position[i] and end index information end_position[i] are determined within the range of $0 \leq i < $ number_of_3D_period.

According to an embodiment of the present invention, if a 3D reproduction period is formed of one ES, the start index information start_position and the end index information end_position are indexes of one ES.

According to another exemplary embodiment of the present invention, if a 3D reproduction period is formed of a plurality of ESs, the start index information start_position and the end index information end_position are indexes of a base ES from among the plurality of ESs.

FIG. 6B is a diagram illustrating syntax of mixed image formation information used for generating a stereoscopic image data stream, according to an exemplary embodiment of the present invention. In the current embodiment, base and additional view images are respectively selected as left view and right view images.

Referring to FIG. 6B, stereoFormat_params represents the mixed image formation information that includes a mixed image format type stereo_format_type of a stereoscopic image; an arrangement order LR_first, a width ratio LR_width_ratio, a height ratio LR_height_ratio of the base and additional view images; a scaling method scaling_method; and a scaling function scaling_func.

The mixed image format type stereo_format_type represents a format type according to a method of forming a mixed image by combining multi-view 2D images. According to an embodiment of the present invention, the mixed image format type stereo_format_type is represented by 8 bits (u(8)). The mixed image format type stereo_format_type will now be described in detail with reference to FIG. 6C.

FIG. 6C is a diagram illustrating a mixed image format type stereo_format_type of mixed image formation information used for generating a stereoscopic image data stream, according to an exemplary embodiment of the present invention.

If the mixed image format type stereo_format_type is 0, a mixed image has a vertical line interleaved format. In this case, the mixed image is generated by alternately arranging vertical lines of base and additional view images on vertical lines of the mixed image.

If the mixed image format type stereo_format_type is 1, the mixed image has a horizontal line interleaved format. In this case, the mixed image is generated by alternately arranging horizontal lines of the base and additional view images on horizontal lines of the mixed image.

If the mixed image format type stereo_format_type is 2, the mixed image has a top-down format. In this case, the mixed image is generated by arranging the base and additional view images, the resolutions of which are reduced by half in the vertical direction, on upper and lower portions of the mixed image, respectively.

If the mixed image format type stereo_format_type is 3, the mixed image has a side-by-side format. In this case, the mixed image is generated by arranging the base and additional view images, the resolutions of which are reduced by half in the horizontal direction, on left and right portions of the mixed image, respectively.

If the mixed image format type stereo_format_type is 4, the mixed image has a field sequential format. In this case, the mixed image is generated by alternately displaying a base view image field and an additional view image field on a reproduction unit.

If the mixed image format type stereo_format_type is 5, the mixed image has a frame sequential format. In this case, the mixed image is generated by alternately displaying a base view image frame and an additional view image frame on the reproduction unit.

If the mixed image format type stereo_format_type is 6, the mixed image has a block interleaved format. In this case, the mixed image is generated by alternately arranging the base and additional view images in block units on blocks of the mixed image.

If the mixed image format type stereo_format_type is 7, the mixed image has a disparity map. In this case, the mixed image is generated using the base view image and the disparity map.

If the mixed image format type stereo_format_type is 8, the mixed image has a depth map. In this case, the mixed image is generated using the base view image and the depth map.

If the mixed image format type stereo_format_type is 9, the mixed image has a disparity+motion map. In this case, the mixed image is generated using the base view image and the disparity+motion map.

If the mixed image format type stereo_format_type is 10, the mixed image has a left view format from among a plurality of stereoscopic image formats. In this case, monoscopic images in a left view are used.

If the mixed image format type stereo_format_type is 11, the mixed image has a right view format from among a plurality of stereoscopic image formats. In this case, monoscopic images in a right view are used.

If the mixed image format type stereo_format_type is one of 12 through 255, the mixed image has a user private format. In this case, an image format designated by a user is used for forming the mixed image.

Referring back to FIG. 6B, the arrangement order LR_first is a parameter representing an arrangement order of the base and additional view images. For example, the arrangement order LR_first represents the arrangement order of the left view and right view images. According to an exemplary embodiment of the present invention, the arrangement order LR_first is represented by 1 bit (u(1)). The arrangement order LR_first will now be described in detail with reference to FIG. 6C.

FIG. 6D is a diagram illustrating an arrangement order LR_first of mixed image formation information used for generating a stereoscopic image data stream, according to an exemplary embodiment of the present invention.

Referring to FIG. 6D, if the arrangement order LR_first is 0, a left view image is a base view image so that image data of the left view image is arranged on odd number vertical lines in a vertical line interleaved format, on odd number horizontal lines in a horizontal line interleaved format, on an upper portion in a top-down format, on a left region in a side-by-side format, on odd number fields in a field sequential format, on odd number frames in a frame sequential format, and on odd number blocks in a block interleaved format. In the case of a stereoscopic image data stream having two ESs, if the arrangement order LR_first is 0, a left view image is determined to be data of a main media (i.e., data of a main ES), and a right view image is determined to be data of a sub media (i.e., data of an auxiliary ES). Likewise, a right view image is an additional view image so that image data of the right view image is arranged on the opposite region to the region where the image data of the left view image is arranged in the above-described mixed image formats.

If the arrangement order LR_first is 1, the right view image is the base view image. In this case, arrangement of the image data of the left view and right view images is opposite to the case when the arrangement order LR_first is 0.

Referring back to FIG. 6A, the width ratio LR_width_ratio is a parameter representing a width ratio between the base and additional view images if a mixed image format is a side-by-side format or a top-down format. According to an embodiment of the present invention, the width ratio LR_width_ratio is represented by 32 bits (u(32)). The width ratio LR_width_ratio may be calculated as follows:

$$LR\_width\_ratio = width_{base}/width_{additional} \quad (1),$$

where LR_height_ratio denotes a parameter representing a height ratio between the base and additional view images if the mixed image format is the side-by-side format or the top-down format. According to an embodiment of the present invention, the height ratio LR_height_ratio is represented by 32 bits (u(32)). The height ratio LR_height_ratio may be calculated as follows:

$$LR\_height\_ratio = height_{base}/height_{additional} \quad (2)$$

The scaling method scaling_method is a parameter representing a scaling method used when the left view and right view images are combined when the stereoscopic image data stream has only one ES. The scaling method scaling_method is used for accurately restoring the left view and right view images by a decoding unit. According to an embodiment of the present invention, the scaling method scaling_method is represented by 32 bits (u(32)). The scaling method scaling_method will later be described in detail with reference to FIG. 9A.

Figure 7A:
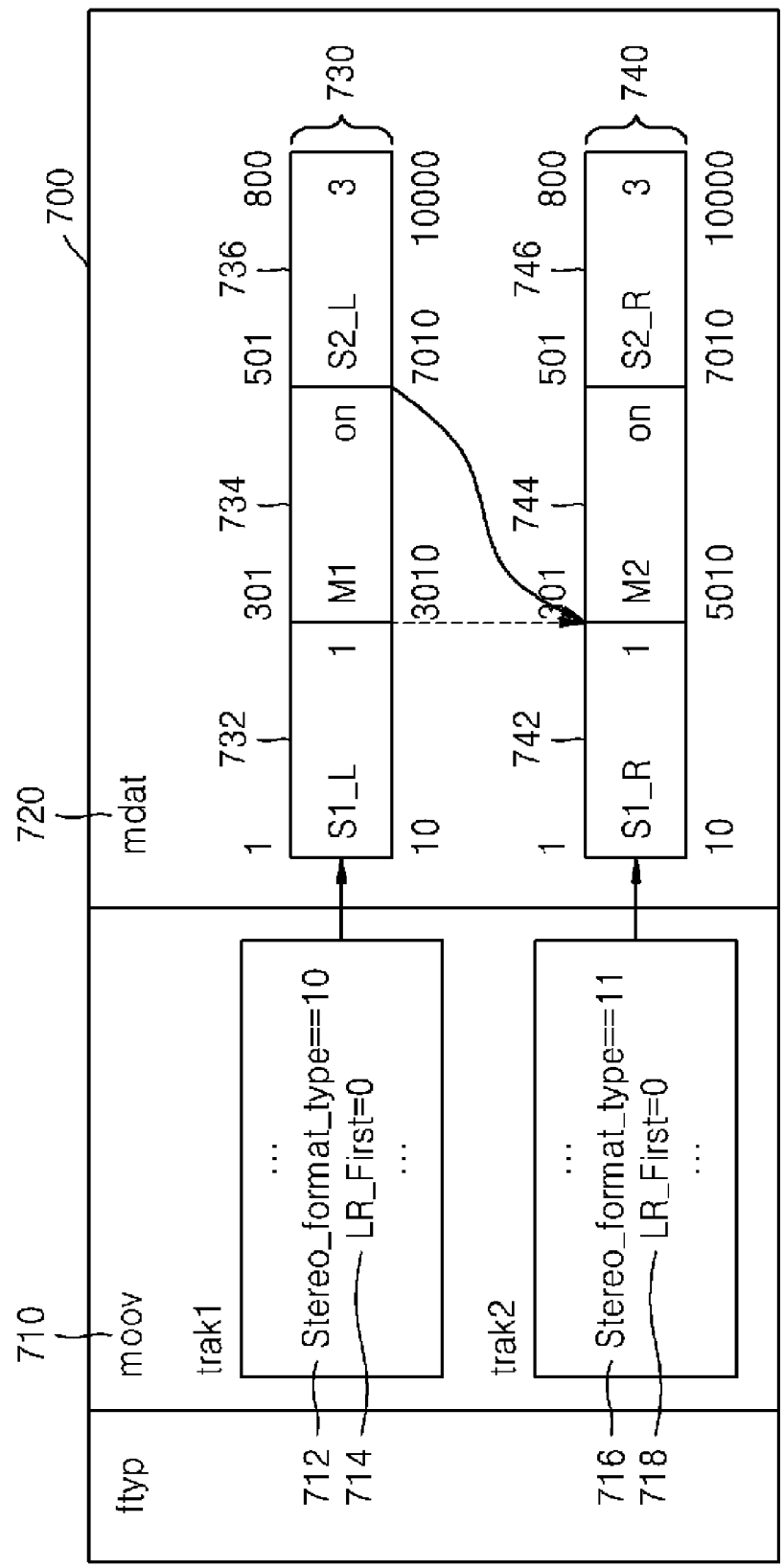
FIG. 7A illustrates a case where there is no collision between monoscopic data regions of two elementary streams (ESs) of a stereoscopic image data stream having stereo image format information and arrangement order information, according to an exemplary embodiment of the present invention.

FIG. 7A illustrates a case where there is no collision between monoscopic data regions of two ESs 730 and 740 of a stereoscopic image data stream 700 having stereo image format information and arrangement order information, according to an exemplary embodiment of the present invention. FIG. 7B are tables illustrating CTs of the two ESs 730 and 740 of the stereoscopic image data stream illustrated in FIG. 7A.

Referring to FIGS. 7A and 7B, the first ES 730 and the second ES 740 are respectively used as a main ES and an auxiliary ES.

In the stereoscopic image data stream 700, a 'moov' box 710 includes parameter information regarding image data streams being respectively indicated by a first track trak1 and second track trak2. An 'mdat' box 720 includes the first ES 730 and the second ES 740 in which image data is recorded. That is, the 'moov' box 710 includes stereo image format information 712 and arrangement order information 714 regarding the image data recorded in the first ES 730 indicated by the track 1 trak1, and stereo image format information 716 and arrangement order information 718 regarding the image data recorded in the second ES 740 indicated by second track trak2.

The first ES 730 includes a first data region 732, a second data region 734, and a third data region 736. The second elementary stream 740 includes a first data region 742, a second data region 744 and a third data region 746. The numbers marked on and below each data region denotes a frame number and a CTS, respectively.

In an ISO-based media file format, there is a box referred to as 'ctts', in which a CTS is stored. CT represents when a target frame is to be reproduced. It is possible to allow a decoder to reproduce each frame at a desired time by using the CTS stored in the 'ctts' box without performing an additional process.

Each of the first data regions 732 and 742 includes image data with frame numbers 1 to 300. Each of the second data regions 734 and 744 includes image data with frame numbers 301 to 50. Each of the third data regions 736 and 746 includes image data with frame numbers 501 to 800.

Referring to FIGS. 7A and 7B, the CTs of the data regions 734 and 744 which are current data regions do not overlap with each other. That is, the CT of the data region 734 is 3010 to 5000 and the CT of the data region 744 is 5001 to 7000. Thus, the CTs of the data regions 734 and 744 do not overlap with each other. In this case, the monoscopic image data period determination unit 510 and the collision monoscopic image data extraction unit 530 of the decoding apparatus 500 do not need to determine a data region that is to be reproduced.

Figure 8A:
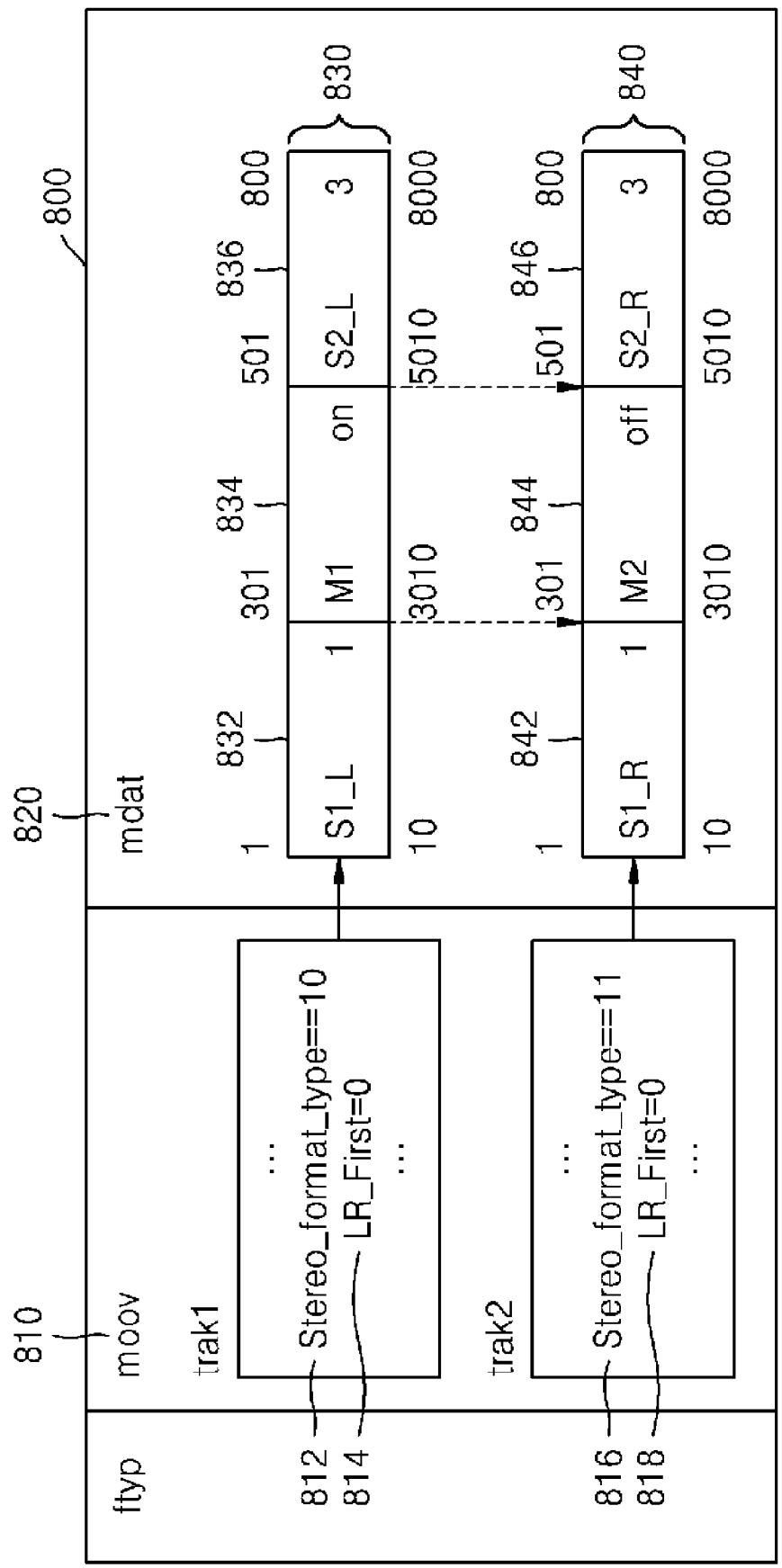
FIG. 8A illustrates a case where there is a collision between monoscopic data regions of two ESs of a stereoscopic image data stream having stereo image format information and arrangement order information, according to an exemplary embodiment of the present invention.

FIG. 8A illustrates a case where there is a collision between monoscopic data regions of two ESs 830 and 840 of a stereoscopic image data stream 800 having stereo image format information and arrangement order information, according to an embodiment of the present invention. FIG. 8B are tables illustrating CTs of the two ESs 830 and 840 of the stereoscopic image data stream illustrated in FIG. 8A.

Referring to FIGS. 8A and 8B, the first and second ESs 830 and 840 are respectively used as a main ES and an auxiliary ES.

In stereoscopic image data stream 800, the 'moov' box 810 includes stereo image format information 812 and arrangement order information 814 regarding image data recorded in the first ES 830 of a 'mdat' box 820, which is indicated by a first track trak1, and stereo image format information 816 and arrangement order information 818 regarding image data recorded in the second ES 840 of the 'mdat' box 820, which is indicated by a second track trak2.

Referring to FIGS. 8A and 8B, the CTs of the second data region 834 of the first ES 830 and the second data region 844 of the second ES 840, which are current data regions, are the same. Thus, if the data regions 834 and 844 are monoscopic image data regions, collision may occur since whether the data region 834 or 844 is to be reproduced is not determined.

Accordingly, the monoscopic image data period determination unit 510 of the decoding apparatus 500 detects a monoscopic image data region from among a plurality of data regions of the first and second ESs 830 and 840. The monoscopic image data period determination unit 510 uses the stereo image format information 812 and 816 stored in the 'moov' box in order to detect monoscopic image data region.

Also, when collision occurs, the collision monoscopic image data extraction unit 530 uses the arrangement order information 814 and 818 included in the 'moov' box in order to determine whether the first or second ES 830 or 840 is to be reproduced.

Likewise, the collision monoscopic image data extraction unit 530 uses all the stereo image format information 812 and 816 and the arrangement order information 814 and 818 stored in the 'moov' box in order to determine an image data region of the first or second ES 830 or 840 that is to be first reproduced from among a plurality of monoscopic image data regions.

For example, referring to FIG. 8A, when current data regions are the second data regions 834 and 844, a single left-view image is recorded in the second data region 834 of the first ES 830 when referring to FIG. 6C since the stereo image format information 812 is '10'. Also, since the arrangement order information 814 is '0', a left-view image is a first elementary stream, that is, a main elementary stream when referring to FIG. 6D.

Also, since the stereo image format information 816 is '11', a single right-view image is recorded in the second data region 844 of the second ES 840 when referring to FIG. 6C. Also, since the arrangement order information 818 is '0', a right-view image is an auxiliary elementary stream when referring to FIG. 6D.

When collision occurs in a CTS, the reproduction stream determination unit of the decoding apparatus 500 determines whether a main ES (main media) or an auxiliary ES (sub media) is to be reproduced. For example, if the reproduction stream determination unit determines the main ES (main media) to be reproduced, the data region 834 of the first ES 830 (main ES) is 'on' when a collision occurs between the second data regions 834 and 844. Thus, the image data of the data region 834 is first reproduced from CTSs 3010 to 5000.

As described above, the reproduction stream determination unit is capable of determining a desired data stream according to a user's input, regardless of the stereo image format information 812 and 816 and the arrangement order information 814 and 818. For example, if a user inputs a reproduction stream selection signal indicating that data in the second ES 840 must be reproduced when a collision occurs in a CTS in a monoscopic image data region, the collision monoscopic image data extraction unit 530 extracts monoscopic image data of the second ES 840 when a collision occurs.

FIG. 9A is a diagram illustrating a scaling function used in a scaling method scaling_method for generating a stereoscopic image data stream, according to an exemplary embodiment of the present invention.

Referring to FIG. 9A, if the scaling method scaling_method is '0', a stereoscopic image has been scaled using a sampling method. In the sampling method, a monoscopic image is scaled by extracting pixels at predetermined periods.

If the scaling method scaling_method is '1', the stereoscopic image has been scaled using a linear method. In the linear method, pixels of a mixed image are generated using pixel values calculated by a linear equation using one or more pixel values of the monoscopic image.

If the scaling method scaling_method is '2', the stereoscopic image has been scaled using a cubic convolution method. In the cubic convolution method, the pixels of the mixed image are generated using average values calculated according to distances of sixteen neighbouring pixels surrounding a current pixel.

If the scaling method scaling_method is one of '3' through '255', the stereoscopic image has been scaled using a user private scaling function.

FIG. 9B is a diagram illustrating syntax of a scaling method scaling_method used for generating a stereoscopic image data stream, according to an exemplary embodiment of the present invention.

Referring to FIG. 9B, scaling_func represents a scaling function determined by a user when a scaling method scaling_method is one of '3' through '255'. According to the current embodiment, horizontal and vertical 2D scaling function coefficients are required in order to determine the scaling method scaling_method.

number_of_hor_coeff represents the number of horizontal coefficients of the scaling function determined by the user. According to an embodiment of the present invention, the number of horizontal coefficients number_of_hor_coeff is represented by 8 bits (u(8)).

hor_scaling_coeff represents a horizontal coefficient of the scaling function determined by the user. The horizontal coefficient hor_scaling_coeff is required as many as the number of horizontal coefficients number_of_hor_coeff. Thus, assuming that i is an integer, a horizontal coefficient hor_scaling_coeff[i] must be determined in the range of 0≦i<number_of_hor_coeff. According to an embodiment of the present invention, the horizontal coefficient hor_scaling_coeff[i] is represented by 32 bits (u(32)).

Assuming that $y_{hor}[i]$ represents a horizontal pixel value of a scaled image, $x_{hor}[i]$ represents the horizontal pixel value of the original image, and $h_{hor}[i]$ represents the horizontal pixel value of the scaling function determined by the user, the relationship among $y_{hor}[i]$, $x_{hor}[i]$, and $h_{hor}[i]$ is represented as follows:

$$y_{hor}[i]=x_{hor}[i]*h_{hor}[i] \quad (3),$$

where * represents a convolution operation.

number_of_ver_coeff represents the number of vertical coefficients of the scaling function determined by the user. According to an embodiment of the present invention, the number of vertical coefficients number_of_ver_coeff is represented by 8 bits (u(8)).

ver_scaling_coeff represents a vertical coefficient of the scaling function determined by the user. The vertical coefficient ver_scaling_coeff is used as many as the number of vertical coefficients number_of_ver_coeff. Thus, assuming that i is an integer, a vertical coefficient ver_scaling_coeff[i] is determined in the range of 0≦i<number_of_ver_coeff. According to an embodiment of the present invention, the vertical coefficient ver_scaling_coeff[i] is represented by 32 bits (u(32)).

Assuming that $y_{ver}[i]$ represents a vertical pixel value of the scaled image, $x_{ver}[i]$ represents the vertical pixel value of the original image, and $h_{ver}[i]$ represents the vertical pixel value of the scaling function determined by the user, the relationship among $y_{ver}[i]$, $x_{ver}[i]$, and $h_{ver}[i]$ is represented as follows:

$$y_{ver}[i]=x_{ver}[i]*h_{ver}[i] \quad (4),$$

where * represents a convolution operation.

FIG. 9C is a diagram illustrating syntax of camera information used for generating a stereoscopic image data stream, according to an exemplary embodiment of the present invention.

Referring to FIG. 9C, camera_distance represents the distance between stereoscopic cameras. According to an embodiment of the present invention, the camera distance camera_distance is represented by 32 bits (u(32)).

view_type represents a view type such as a crossed-eye view or a parallel-eye view. According to an embodiment of the present invention, the view type view_type is represented by 8 bits (u(8)).

view_distance_vs_depth represents the ratio of a viewing distance to a use/validity depth. According to an embodiment of the present invention, the viewing distance to depth ratio view_distance_vs_depth is represented by 32 bits (u(32)).

camera_type represents the camera type of a camera used when a stereoscopic image is obtained. According to an embodiment of the present invention, the camera type camera_type is represented by 8 bits (u(8)).

is_camera_params represents camera parameter transmission information indicating whether camera parameters camera_params are transmitted or not. If the camera parameter transmission information is_camera_params is not '0', the camera parameters camera_params of base and additional view cameras are transmitted. According to an embodiment of the present invention, the camera parameter transmission information is_camera_params is represented by 1 bit (u(1)).

Is_parallel_info represents parallax information transmission information indicating whether parallax information parallax_info is transmitted or not. If the parallax information transmission information is_parallax_info is not '0', the parallax information parallax_info is transmitted. According to an embodiment of the present invention, the parallax information transmission information is_parallax_info is represented by 1 bit (u(1)).

FIG. 9D is a diagram illustrating syntax of camera parameters camera_params of camera information used for generating a stereoscopic image data stream, according to an exemplary embodiment of the present invention. In the current embodiment, left view and right view images are respectively used as base and additional view images.

The camera parameters camera_params include the number of camera parameters number_of_camera_params, left camera parameters left_camera_params, and right camera parameters right_camera_params.

The number of camera parameters number_of_camera_params represents the number of camera parameters camera_params. According to an embodiment of the present invention, the number of camera parameters number_of_camera_params is represented by 8 bits (u(8)).

The left camera parameters left_camera_params include parameters regarding peculiar characteristics of a left camera, such as rotation information, translation information, an image center, a focal length, and an aspect ratio. According to an embodiment of the present invention, the left camera parameters left_camera_params are represented by 32 bits (u(32)).

The right camera parameters right_camera_params include parameters regarding peculiar characteristics of a right camera, such as rotation information, translation information, an image center, a focal length, and an aspect ratio. According to an embodiment of the present invention, the right camera parameters right_camera_params are represented by 32 bits (u(32)).

FIG. 9E is a diagram illustrating syntax of parallax information parallax_info used for generating a stereoscopic image data stream, according to an embodiment of the present invention.

Referring to FIG. 9E, the parallax information parallax_info represents parallax information between a global disparity vector global_disparity that occurs in a whole stereoscopic image and a representative disparity vector representative_disparity that occurs in a predetermined object of the stereoscopic image. The representative disparity vector representative_disparity may be a disparity vector having the minimum vector or a disparity vector having the maximum vector from among a plurality of disparity vectors. The object in which the representative disparity vector representative_disparity occurs may be a background, a foreground, or any other individual object.

The parallax information parallax_info includes the number of global disparity vectors num_of_global_disparity, a global disparity start index global_disparity_index, the global disparity vector global_disparity, the number of representative disparity vectors num_of_representative_disparity, and the representative disparity vector representative_disparity.

The number of global disparity vectors num_of_global_disparity represents the number of frames recorded in a payload region in which global disparities are changed. According to an embodiment of the present invention, the number of global disparity vectors num_of_global_disparity is represented by 32 bits (u(32)).

The global disparity start index global_disparity_index represents an index of a frame in which a global disparity starts from among frames in which the global disparity vector global_disparity occurs. According to an embodiment of the present invention, the global disparity start index global_disparity_index is represented by 32 bits (u(32)).

The global disparity vector global_disparity represents a vector of the global disparity. According to an embodiment of the present invention, the global disparity vector global_disparity is represented by 16 bits (u(16)).

Assuming that i is an integer and falls within the range of 0≦i<num_of_global_disparity, a global disparity vector global_disparity[i] is a vector value of the global disparity between a disparity global disparity start index global_disparity_index[i] and a global disparity start index global_disparity_index[i+1].

The number of representative disparity vectors num_of_representative_disparity represents the number of representative disparities. According to an embodiment of the present invention, the number of representative disparity vectors num_of_representative_disparity is represented by 8 bits (u(8)).

The representative disparity vector representative_disparity represents a vector value of a representative disparity. According to an embodiment of the present invention, the representative disparity vector representative_disparity is represented by 16 bits (u(16)).

Assuming that i is an integer and falls within the range of 0≦i<num_of_representative_disparity, a representative disparity vector representative_disparity[i] represents a representative disparity vector value. The representative disparity vector value may be the minimum or maximum value of a disparity vector, a disparity vector of a representative object, the minimum or maximum value that can be represented by a disparity/depth vector map.

Figure 10:
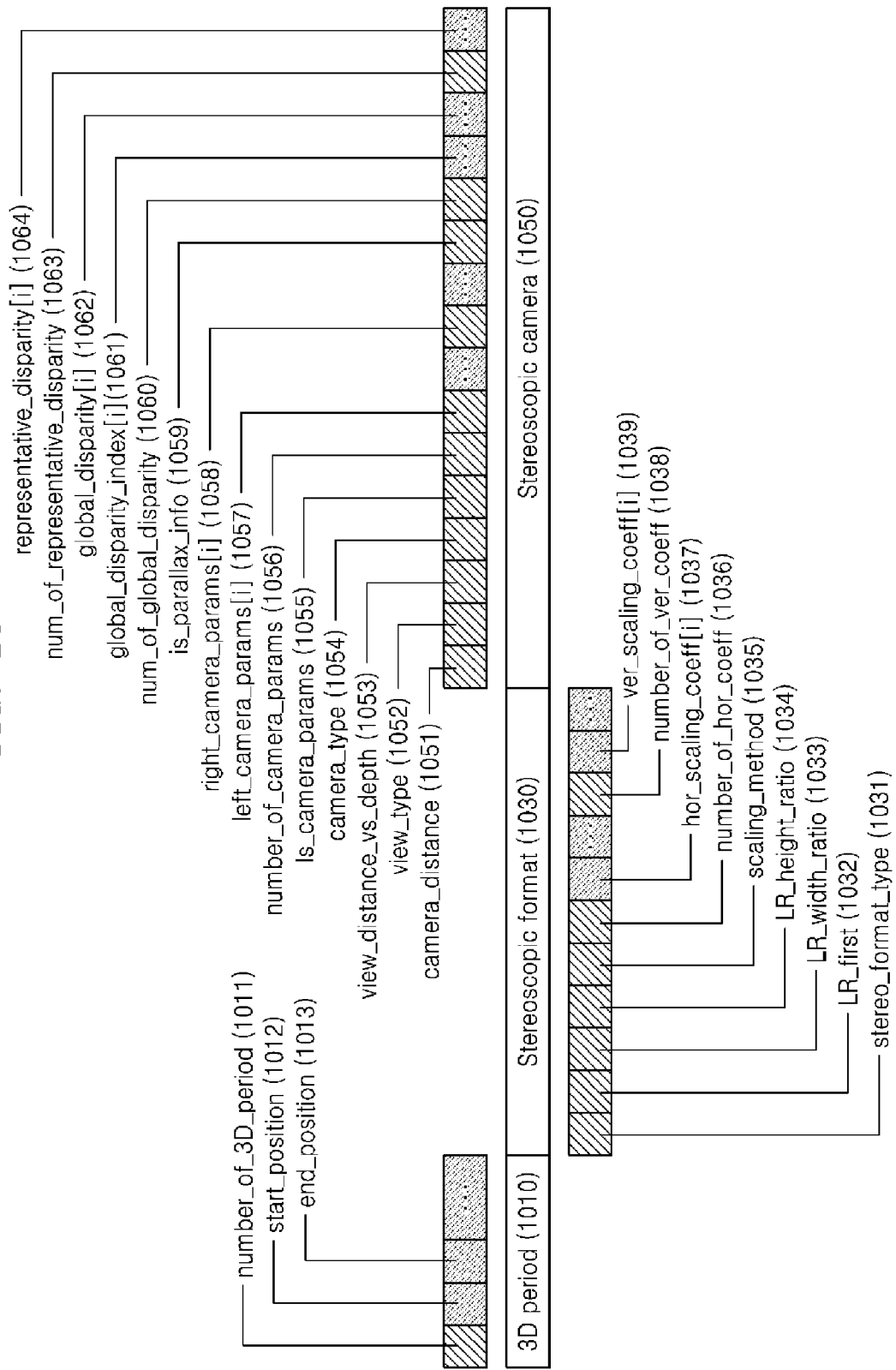
FIG. 10 is a diagram illustrating a header region of a stereoscopic image data stream, according to an exemplary embodiment of the present invention.

FIG. 10 is a diagram illustrating a header region of a stereoscopic image data stream, according to an exemplary embodiment of the present invention.

Referring to FIG. 10, the header region of the stereoscopic image data stream generated by the generating apparatus 400 illustrated in FIG. 4 or the generating apparatus 405 illustrated in FIG. 4B, includes a 3D reproduction information region 3D_period 1010, a mixed image formation information region Stereoscopic format 1030, and a camera information region Stereoscopic camera 1050.

The 3D reproduction information region 3D_period 1010 includes the number of 3D reproduction periods number_of_3D_period 1011, start index information start_position 1012, and end index information end_position 1013.

The mixed image formation information region Stereoscopic format 1030 includes a mixed image format type stereo_format_type 1031 of a stereoscopic image, an arrangement order LR_first 1032 of base and additional view images, a width ratio LR_width_ratio 1033 of the base and additional view images, a height ratio LR_height_ratio 1034 of the base and additional view images, a scaling method scaling_method 1035, the number of horizontal coefficients number_of_hor_coeff 1036 of a scaling function, a horizontal coefficient hor_scaling_coeff[i] 1037 of the scaling function, the number of vertical coefficients number_of_ver_coeff 1038 of the scaling function, and a vertical coefficient ver_scaling_coeff[i] 1039 of the scaling function.

The camera information region Stereoscopic camera 1050 includes a camera distance camera_distance 1051 between stereoscopic cameras, a view type view_type 1052 of the stereoscopic image, a viewing distance to depth ratio view_distance_vs_depth 1053, a camera type camera_type 1054 of cameras used for obtaining the stereoscopic image, camera parameter transmission information is_camera_params 1055, the number of camera parameters number_of_camera_params 1056, left camera parameters left_camera_params 1057, and right camera parameters right_camera_params 1058.

The camera information region Stereoscopic camera 1050 further includes parallax information transmission information is_parallax_info 1059, the number of global disparity vectors num_of_global_disparity 1060, a global disparity start index global_disparity_index[i] 1061, a global disparity vector global_disparity[i] 1062, the number of representative disparity vectors num_of_representative_disparity 1063, and a representative disparity vector representative_disparity[i] 1064.

Figure 11A:
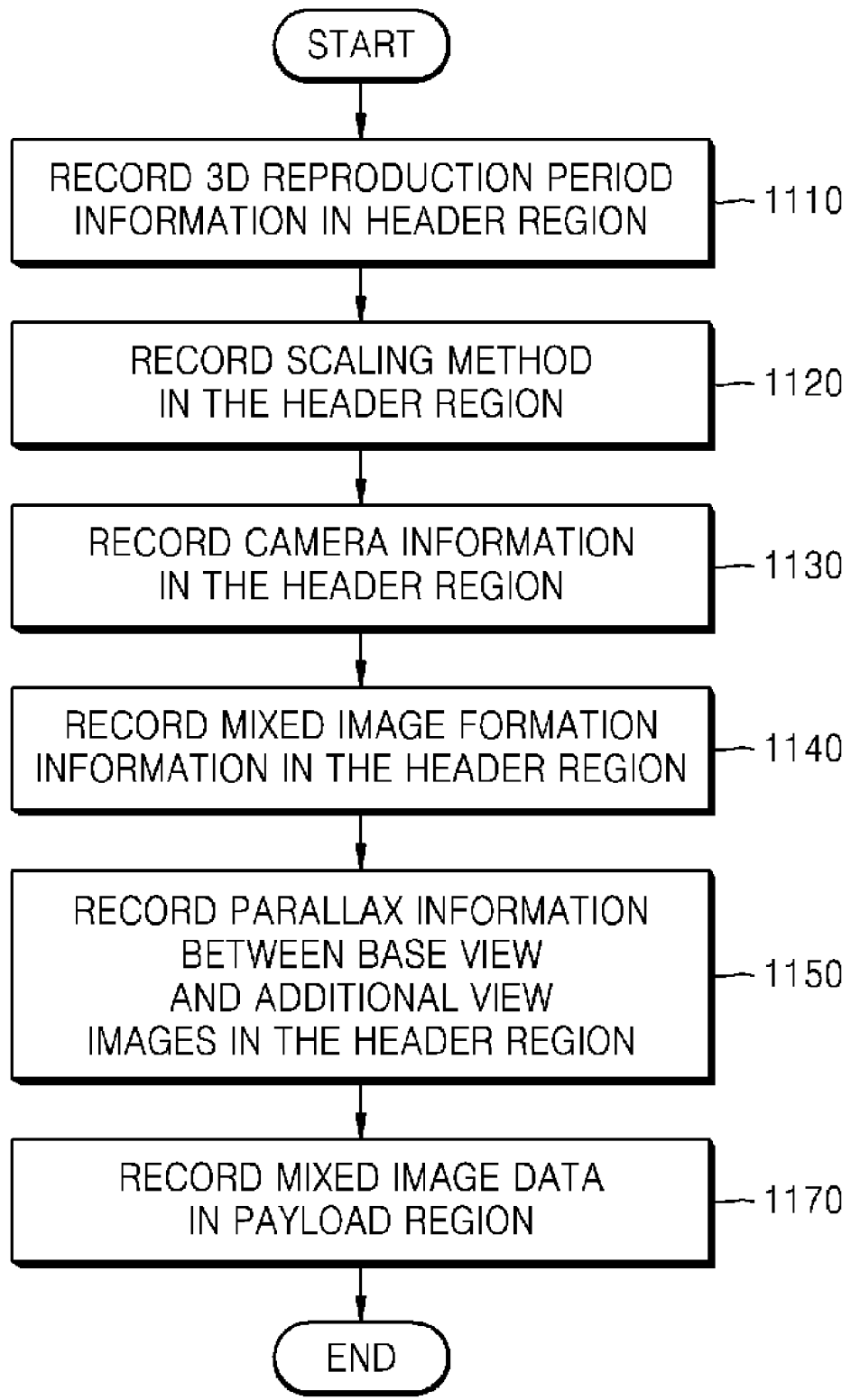
FIG. 11A is a flowchart illustrating a method of generating a stereoscopic image data stream according to an exemplary embodiment of the present invention.

FIG. 11A is a flowchart illustrating a method of generating a stereoscopic image data stream, according to an exemplary embodiment of the present invention.

Referring to FIG. 11A, in operation 1110, 3D reproduction period information regarding three-dimensionally reproduced stereoscopic image data of image data that is to be recorded in a payload region of the stereoscopic image data stream, is recorded in a header region of the stereoscopic image data stream.

In operation 1120, a scaling method used when generating a mixed image having information regarding base and additional view images is recorded in the header region.

In operation 1130, camera information regarding cameras used for obtaining a stereoscopic image is recorded in the header region.

In operation 1140, mixed image formation information regarding a method of generating a mixed image by using the base and additional view images is recorded in the header region.

In operation 1150, parallax information between base and additional view images of the stereoscopic image is recorded in the header region.

In operation 1170, mixed image information regarding the stereoscopic image is recorded in the payload region of the stereoscopic image data stream.

Figure 11B:
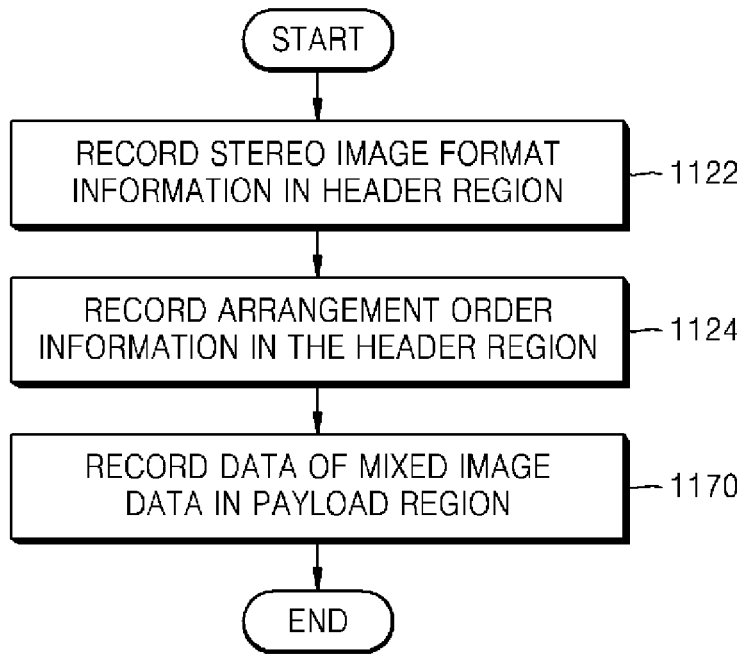
FIG. 11B is a flowchart illustrating in detail an operation of recording mixed image formation information, which is included in a method of generating a stereoscopic image data stream, according to an exemplary embodiment of the present invention.

FIG. 11B is a flowchart illustrating in detail an operation of recording mixed image formation information, which is included in a method of generating a stereoscopic image data stream, according to an exemplary embodiment of the present invention.

In operation 1122, stereo image format information is recorded in a header region of a stereoscopic image data stream, where the stereo image format information specifies a method of forming a mixed image having information regarding base and additional view images of a stereoscopic image In operation 1124, arrangement order information is recorded in the header region of the stereoscopic image data stream, where the arrangement order information specifies the order in which the information regarding the base view image and information regarding the additional view image are arranged in the mixed image.

In operation 1170, data of the mixed image regarding the stereoscopic image is recorded in a payload region of the stereoscopic image data stream.

Figure 12:
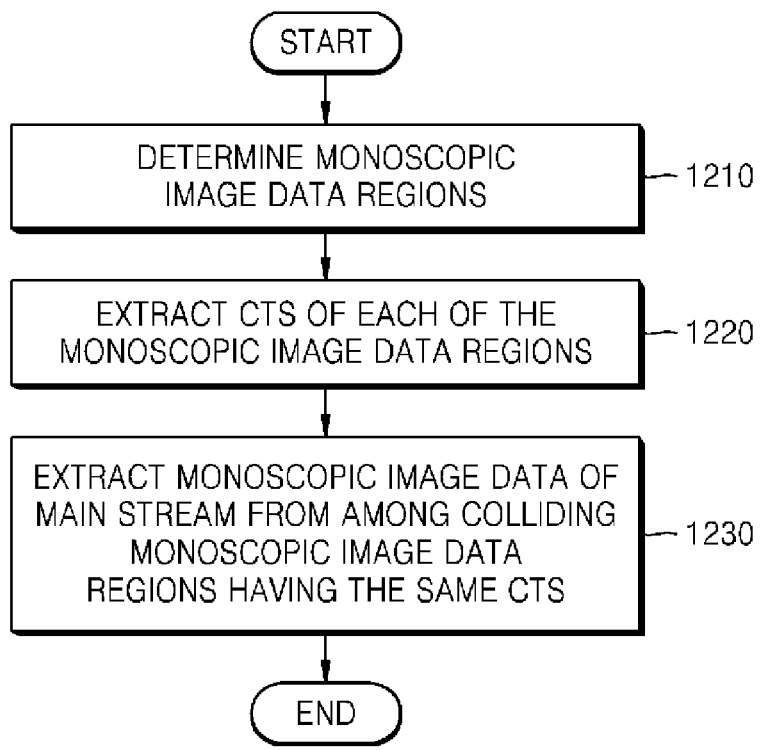
FIG. 12 is a flowchart illustrating a method of decoding a stereoscopic image data stream according to an exemplary embodiment of the present invention.

FIG. 12 is a flowchart illustrating a method of decoding a stereoscopic image data stream according to an embodiment of the present invention. In operation 1210, a plurality of monoscopic image data regions are determined from among image data regions of a stereoscopic image data stream. The stereoscopic image data stream may include a main stream and at least one auxiliary stream. A plurality of monoscopic image data regions are determined from among image data regions of each of the main stream and the auxiliary stream. It is possible to determine whether an image has a monoscopic image format, based on stereo image format information regarding an image data region.

In operation 1220, a CTS of each of the monoscopic image data regions is extracted.

In operation 1230, if there are colliding monoscopic image data regions having the same CTS, monoscopic image data is extracted from a monoscopic image data region of a main stream from among the colliding monoscopic image data regions. Whether a current image data region belongs to the main stream can be determined based on arrangement order information regarding an image data region. The extracted monoscopic image data may be reconstructed and reproduced from a monoscopic image.

Figure 13:
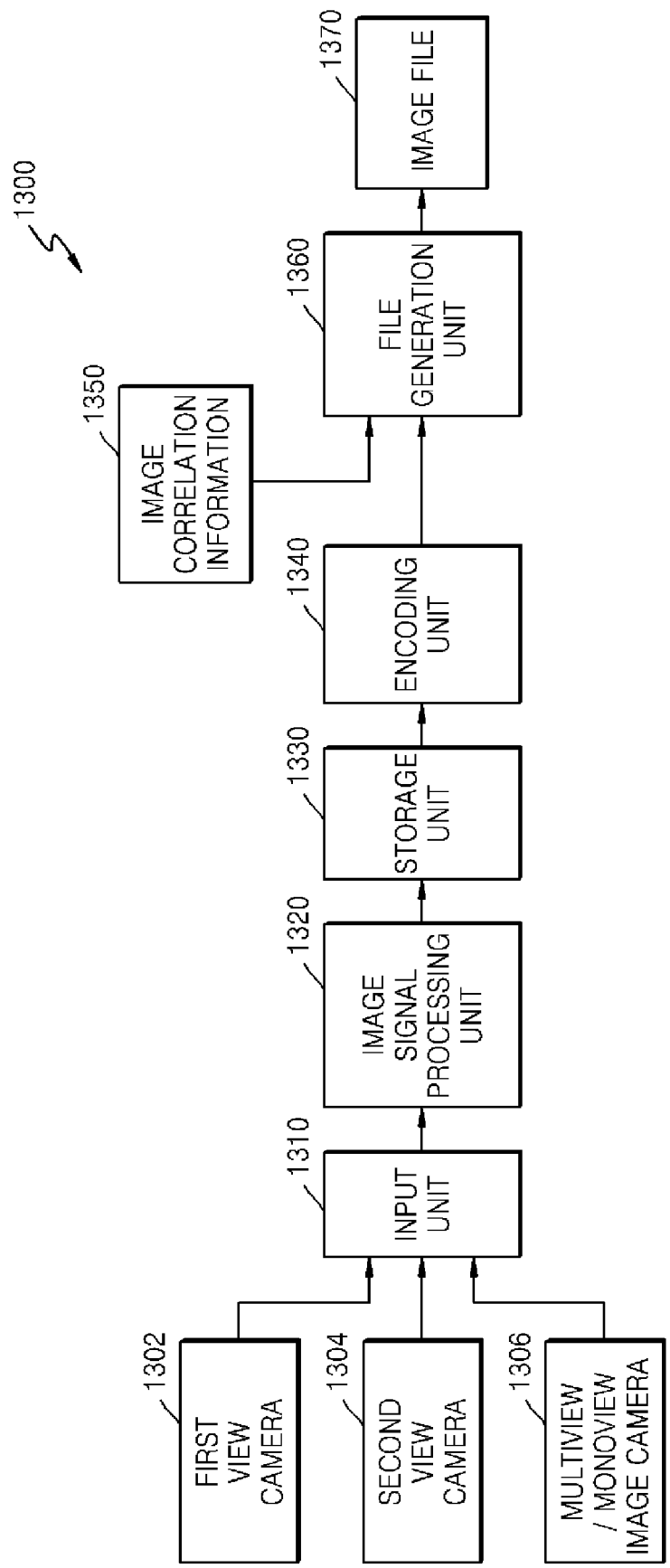
FIG. 13 is a block diagram of a stereoscopic image file generation system using a stereoscopic image datastream generation method, according to an embodiment of the present invention.

FIG. 13 is a block diagram of a stereoscopic image file generation system 1300 using a stereoscopic image datastream generation method, according to an embodiment of the present invention.

Referring to FIG. 13, the stereoscopic image file generation system 1300 includes a first view camera 1302, a second view camera 1304, a multiview/monoview image camera 1306, an input unit 1310, an image signal processing unit 1320, a storage unit 1330, an encoding unit 1340, and a file generation unit 1360.

The first and second view cameras 1302 and 1304 photograph a predetermined subject at first and second views so as to output different first and second view images, respectively. If a monoview image is also captured by the stereoscopic image file generation system 1300, a monoscopic image is output from the multiview/monoview image camera 1306. An image output from each of the first and second view cameras 1302 and 1304 and the multiview/monoview image camera 1306 is input to the input unit 1310.

The image input to the input unit 1310 is pre-processed by the image signal processing unit 1320. For example, external image values, which are analog values, are converted into digital values. Here, the external image values mean components of light and colors which are recognized by a sensor of a charge-coupled device (CCD) type or a complementary metal-oxide semiconductor (CMOS) type.

The storage unit 1330 stores image data of the pre-processed image and provides the image data to the encoding unit 1340. Although the storage unit 1330 is separately illustrated, the stereoscopic image file generation system 1300 may further include other storage elements for buffering between the other elements of the stereoscopic image file generation system 1300, which are not the storage unit 1330.

The encoding unit 1340 encodes the image data received from the storage unit 1330. If necessary, the encoding of the image data by the encoding unit 1340 may be omitted.

The file generation unit 1360 inserts image correlation information 1350 and the (encoded) image data received from the encoding unit 1340, into a predetermined file format so as to generate an image file 1370. The image correlation information 1350 may include reference information of a track box for representing correlations between images, and handler information for representing a media type of each image.

Also, the image correlation information 1350 may include two-dimensional (2D) image-related information and three-dimensional (3D) image-related information. The 3D image-related information represents a correlation between the first and second view images, and may include information on 2D/3D data sections, information on an arrangement method of the first and second view images, information on an image file type, a camera parameter, display information, and information on a view difference.

According to an embodiment of the present invention, the file generation unit 1360 may store the image data and the image correlation information 1350 respectively in a media data region and a header region of the image file 1370. If the image file 1370 is an ISO-based media file format, the image data may be stored in the form of an elementary stream, in an mdat box, and the image correlation information 1350 may be stored in a trak box or any sub-level box of the trak box.

The image file 1370 is input or transmitted to a 3D image file reproduction apparatus.

Figure 14:
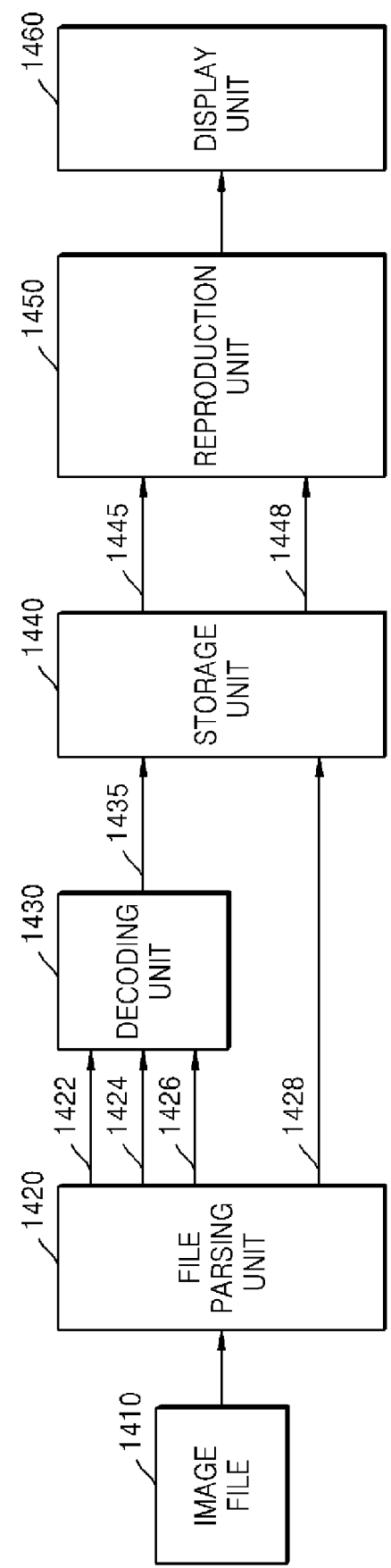
FIG. 14 is a block diagram of a stereoscopic image restoration/reproduction system using a stereoscopic image restoration method, according to an embodiment of the present invention

FIG. 14 is a block diagram of a stereoscopic image restoration/reproduction system 1400 using a stereoscopic image restoration method, according to an embodiment of the present invention.

Referring to FIG. 14, the stereoscopic image restoration/reproduction system 1400 includes a file parsing unit 1420, a decoding unit 1430, a storage unit 1440, a reproduction unit 1450, and a display unit 1460.

The file parsing unit 1420 parses a received image file 1410. After information stored in each of a ftyp box, a moov box, a trak box, and a meta box is analyzed, image data stored in an mdat box may be extracted. First view image data 1422, second view image data 1424, and multiview/monoview image data 1426 may be extracted as the image data. By parsing the image file 1410, image data-related information 1428 may also be extracted. The image data-related information 1428 may include correlation information between images, such as trak reference information regarding related tracks.

The decoding unit 1430 receives and decodes the image data including the first view image data 1422, the second view image data 1424, and the multiview/monoview image data 1426 which are extracted from the image file 1410. The decoding is performed only if the image data in the image file 1410 has been encoded. The storage unit 1440 receives and stores (decoded) image data 1435 that is output from the decoding unit 1430, and the extracted image data-related information 1428 that is extracted by the file parsing unit 1420.

The reproduction unit 1450 receives image reproduction-related information 1448 and image data 1445 to be reproduced, from the storage unit 1440 so as to reproduce an image. The image reproduction-related information 1448 is information required to reproduce the image from among the image data-related information 1428, and includes image correlation information.

The reproduction unit 1450 may reproduce the image data 1445 in a 2D or 3D image reproduction method, by using the image reproduction-related information 1448. For example, the reproduction unit 1450 may combine and reproduce correlated stereoscopic images by referring to image data identification information. Also, the reproduction unit 1450 may reproduce the correlated stereoscopic images and a monoscopic image together, by referring to the image data identification information and 2D/3D data section information.

The display unit 1460 may display the image reproduced by the reproduction unit 1450, on a screen. The display unit 1460 may be a barrier liquid crystal display (LCD). A monoscopic image may be displayed when the barrier LCD is turned off, and each view image of a stereoscopic image may be displayed when the barrier LCD is turned on.

The above exemplary embodiments of the present invention can be embodied as computer program that can be executed in a computer and be embodied in a general digital computer via a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

As described above, in a method and apparatus for generating a stereoscopic image data stream according to an exemplary embodiment of the present invention, if single view images having the same CTS are recorded in a plurality of ESs of a stereoscopic image data stream, it is possible to generate a stereoscopic image data stream containing mixed image format information regarding a stereoscopic image and arrangement order information that represents the order in which various view images are arranged in a mixed image, so that a single view image that is to be reproduced is automatically selected and decoded from among the single view images.

Also, even if a collision occurs between CTSs of single view images, a single view image that is to be reproduced can be selected and decoded in a receiving side from among single view images, based on the mixed image format information and the arrangement order information.

Accordingly, a method and apparatus for generating a stereoscopic image data stream according to an exemplary embodiment of the present invention allows a stereoscopic image to be reproduced in various types of reproducing apparatuses at an appropriate point of time and maximizes stereoscopic effect. Also, 2D and 3D images of a stereoscopic image can be partially reproduced, thereby alleviating a sense of fatigue that a user would feel when viewing 3D images for a long time and effectively achieving stereoscopic effect.

Exemplary embodiments of the present invention relate to a format of a stereoscopic image that has a simplest format from among 3D images, and the field of 3D images includes all currently used 2D encoding/decoding apparatuses. Therefore, exemplary embodiments of the present invention can be applied to stereoscopic digital televisions (TVs) employing a plasma display panel (PDP), liquid crystal display (LCD) or digital light processing (DLP) method, stereoscopic personal computer (PC) monitors, stereoscopic camcorders, stereoscopic Blu-ray disk (BD) players, and so on.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of decoding a stereoscopic image data stream including a main stream and an auxiliary stream, the method comprising:
   extracting composition time stamps of monoscopic image data regions from individual streams of the main stream and the auxiliary stream;
   if the monoscopic image data regions have the same composition time stamps, determining which stream of the individual streams is the main stream containing base view images; and
   reproducing monoscopic image data extracted from at least on monoscopic image data region the determined main stream,
   wherein each of the main stream and the auxiliary stream comprises at least one stereoscopic image data region and at least one monoscopic image data region.

2. The method of claim 1, wherein the extracting composition time stamps of the plurality of monoscopic image data regions comprises:
   extracting stereo image format information regarding at least one image data region from the stereoscopic image data stream; and
   determining at least one monoscopic image data region from among the at least one image data region based on the extracted stereo image format information,
   wherein the stereo image format information relates to an image format according to a method of generating a mixed image using information regarding a base view image and an additional view image of a stereoscopic image.

3. The method of claim 2,
   wherein the determining the plurality of monoscopic image data regions comprises:
   extracting the stereo image format information and arrangement order information regarding at least one image data region from the stereoscopic image data stream; and
   determining the at least one monoscopic image data region of the main stream, based on the stereo image format information and the arrangement order information,
   wherein the reproducing the monoscopic image data comprises extracting the monoscopic image data from the determined monoscopic image data region of the main stream,
   wherein the stereo image format information relates to an image format according to a method of generating a mixed image using information regarding a base view image and an additional view image of the stereoscopic image, and
   wherein the arrangement order information represents an order in which the information regarding the base and additional view images is arranged in the mixed image with respect to at least one data region.

4. The method of claim 3, wherein if the stereoscopic image data stream has an International Standardization Organization (ISO)-based media file format:
the ISO-based media file format comprises a moov box, an mdat box, and a meta box, and
the stereo image format information and the arrangement order information are extracted from at least one of a lower level box of the meta box, a lower level box of the moov box, a lower level box of a trak box which is a lower level of the moov box, a lower level box of a trak box, and a lower level box of a meta box which is a lower level of the trak box.

5. The method of claim 2, wherein the stereo image format information comprises at least one of a vertical line interleaved format, a horizontal line interleaved format, a top-down format, a side-by-side format, a field sequential format, a frame sequential format, a block interleaved format, a disparity map, a depth map, a disparity and motion map, a monoscopic base view image format, and a monoscopic additional view image format.

6. The method of claim 1, wherein the reproducing the monoscopic image data comprises;
extracting arrangement order information regarding each of the two or more colliding image data regions having the same composition time stamps, from the stereoscopic image data stream; and
extracting monoscopic image data from an image data region of one of the main stream and the auxiliary stream, based on the arrangement order information,
wherein the arrangement order information represents an order in which information regarding base and additional view images are arranged in a mixed image with respect to at least one data region.

7. The method of claim 1, further comprising determining whether the main stream or the auxiliary stream is to be first reproduced if a monoscopic image of image data of the stereoscopic image data stream is reproduced.

8. The method of claim 7, wherein the reproducing the monoscopic image data further comprises reconstructing and reproducing image data extracted from the main stream or the auxiliary stream that is determined to be first reproduced.

9. The method of claim 1, wherein the stereoscopic image data stream has an International Standardization Organization-based media file format.

10. An apparatus for decoding a stereoscopic image data stream including a main stream and an auxiliary stream, the apparatus comprising:
a composition time stamp extraction unit which extracts composition time stamps of the plurality of monoscopic image data regions from individual streams of the main stream and the auxiliary stream;
a collision monoscopic image data determination unit which, if, among the plurality of monoscopic image date regions, there are image data regions having the same composition time stamps, determining which stream of the individual streams is the main stream containing base view images; and
a reproduction unit which reproduces monoscopic image data extracted from at least one monoscopic image data region of the determined main stream,
wherein each of the main stream and the auxiliary stream comprises at least one stereoscopic image data region and at least one monoscopic image data region.

11. The apparatus of claim 10, further comprising a monoscopic image data period determination unit extracts stereo image format information regarding at least one image data region from the stereoscopic image data stream; and determines at least one monoscopic image data region from among the at least one image data region based on the extracted stereo image format information, and
wherein the stereo image format information relates to an image format according to a method of generating a mixed image using information regarding a base view image and an additional view image of a stereoscopic image.

12. The apparatus of claim 11, wherein
the monoscopic image data period determination composition time stamps extraction unit extracts the stereo image format information and arrangement order information regarding at least one image data region from the stereoscopic image data stream; and determines the at least one monoscopic image data region of the main stream, based on the stereo image format information and the arrangement order information,
the reproduction unit extracts monoscopic image data from the determined monoscopic image data region of the main stream,
the stereo image format information relates to an image format according to a method of generating a mixed image using information regarding a base view image and an additional view image of the stereoscopic image, and
the arrangement order information represents order in which the information regarding the base and additional view images is arranged in the mixed image with respect to at least one data region.

13. The apparatus of claim 12, wherein if the stereoscopic image data stream has an International Standardization Organization (ISO)-based media file format, the ISO-based media file format comprises a moov box, an mdat box, and a meta box, and
the stereo image format information and the arrangement order information are extracted from at least one of a lower level box of the meta box, a lower level box of the moov box, a lower level box of a trak box which is a lower level of the moov box, a lower level box of a trak box, and a lower level box of a meta box which is a lower level of the trak box.

14. The apparatus of claim 11, wherein the stereo image format information comprises at least one of a vertical line interleaved format, a horizontal line interleaved format, a top-down format, a side-by-side format, a field sequential format, a frame sequential format, a block interleaved format, a disparity map, a depth map, a disparity and motion map, a monoscopic base view image format, and a monoscopic additional view image format.

15. The apparatus of claim 10, wherein the reproduction unit extracts arrangement order information regarding each of the image data regions having the same composition time stamps, from the stereoscopic image data stream; and extracts monoscopic image data from an image data region of one of the main stream and the auxiliary stream, based on the arrangement order information,
wherein the arrangement order information represents an order in which information regarding the base and additional view images is arranged in a mixed image with respect to at least one data region.

16. The apparatus of claim 10, further comprising a reproduction stream determination unit which determines whether the main stream or the auxiliary stream is to be first reproduced if a monoscopic image of image data of the stereoscopic image data stream is reproduced.

17. The apparatus of claim 16, wherein the reproduction unit reconstructs and reproduces monoscopic image data extracted from the main stream or the auxiliary stream that is determined to be first reproduced.

18. The apparatus of claim 10, wherein the stereoscopic image data stream has an International Standardization Organization-based media file format.

19. A non-transitory computer readable medium having recorded thereon a computer program for executing the method of decoding a stereoscopic image data stream of claim 1.

* * * * *